(12) United States Patent
Yazaki et al.

(10) Patent No.: US 7,672,324 B2
(45) Date of Patent: Mar. 2, 2010

(54) PACKET FORWARDING APPARATUS WITH QOS CONTROL

(75) Inventors: Takeki Yazaki, Hachioji (JP); Takeshi Aimoto, Kawasaki (JP)

(73) Assignee: Alaxala Networks Corporation, Kanagawa (JP)

( * ) Notice: Subject to any disclaimer, the term of this patent is extended or adjusted under 35 U.S.C. 154(b) by 997 days.

(21) Appl. No.: 11/365,694

(22) Filed: Mar. 2, 2006

(65) Prior Publication Data

US 2007/0053296 A1 Mar. 8, 2007

(30) Foreign Application Priority Data

Sep. 5, 2005 (JP) .............................. 2005-255819
Jan. 30, 2006 (JP) .............................. 2006-019979

(51) Int. Cl.
H04L 12/56 (2006.01)
H04J 1/16 (2006.01)

(52) U.S. Cl. ..................... 370/412; 370/252; 370/419

(58) Field of Classification Search ................ 370/389, 370/252, 412, 419
See application file for complete search history.

(56) References Cited

U.S. PATENT DOCUMENTS

| 6,466,997 | B1* | 10/2002 | Ross et al. ................... 710/48 |
| 2002/0172150 | A1* | 11/2002 | Kano ......................... 370/216 |
| 2003/0112749 | A1* | 6/2003 | Hassink et al. ............... 370/225 |
| 2003/0123390 | A1* | 7/2003 | Takase et al. ............. 370/230.1 |
| 2005/0207419 | A1* | 9/2005 | Kohzuki et al. .............. 370/392 |
| 2005/0276263 | A1* | 12/2005 | Suetsugu et al. ............. 370/389 |

FOREIGN PATENT DOCUMENTS

| JP | 6-315034 | 11/1994 |
| JP | 2000-069079 | 3/2000 |
| JP | 2000-216791 | 8/2000 |
| JP | 2003-008634 | 1/2003 |
| JP | 2004-254132 | 9/2004 |

OTHER PUBLICATIONS

"A Salt-Clocked Fair Queueing Scheme tor Broadband Applications" by Golestani, et al. pp. 636-646., 1994 IEEE.
"Link Aggregation with 802.3ad" Jan. 2006, www.itworld.com/Net/1750/NWW001113tech/pfindex.html.
"Fast Reroute Extensions to RSVP-TE for LSP Tunnels" by P.Pan, et al. RFC 4090, May 2005.

* cited by examiner

*Primary Examiner*—John Pezzlo
(74) *Attorney, Agent, or Firm*—Mattingly & Malur, P.C.

(57) ABSTRACT

A technique capable of controlling packets to be output to a plurality of ports is provided. Disclosure is made of a packet forwarding apparatus for distributing packets received from a physical port to be transmitted over a plurality of physical ports, which includes a transmitting/receiving unit for transmitting/receiving packets via a physical port, a port group decision unit for deciding a port group corresponding to a plurality of physical ports, and a port group control unit for controlling flow of packets for each port group decided by the port group decision unit.

16 Claims, 29 Drawing Sheets

FIG. 8

OUTPUT
PORT GROUP
NUMBER

OUTPUT PORT
NUMBER TABLE 600

| | | | | |
|---|---|---|---|---|
| 1 | 1 | * | * | * |
| 2 | 2 | * | * | * |
| 3 | 3 | 4 | * | * |
| 4 | * | * | * | * |

PACKET TRANSMISSION CONTROL TABLE 720

| OUTPUT PORT GROUP NUMBER | CLASS | PACKET TRANSMISSION TIME | |
|---|---|---|---|
| 1 | 1 | 5 | 721-1 |
| 1 | 2 | 4 | 721-2 |
| 2 | 1 | 6 | 721-3 |
| 2 | 2 | 7 | 721-4 |
| 3 | 1 | 8 | 721-5 |
| 3 | 2 | 3 | 721-6 |
| 4 | 1 | * | 721-7 |
| 4 | 2 | * | 721-8 |

FIG. 10

FIFO CONTROL TABLE 730

| OUTPUT PORT NUMBER | CLASS | THE NUMBER OF STORED PACKETS | |
|---|---|---|---|
| 1 | 1 | 4 | 731-1 |
| 1 | 2 | 0 | 731-2 |
| 2 | 1 | 6 | 731-3 |
| 2 | 2 | 7 | 731-4 |
| 3 | 1 | 0 | 731-5 |
| 3 | 2 | 1 | 731-6 |
| 4 | 1 | 0 | 731-7 |
| 4 | 2 | 3 | 731-8 |

FIG. 11

BANDWIDTH POLICY STORE UNIT 740

| OUTPUT PORT GROUP NUMBER | CLASS | MAXIMUM BANDWIDTH | |
|---|---|---|---|
| 1 | 1 | 20Mbps | 741-1 |
| 1 | 2 | 80Mbps | 741-2 |
| 2 | 1 | 50Mbps | 741-3 |
| 2 | 2 | 100Mbps | 741-4 |
| 3 | 1 | 40Mbps | 741-5 |
| 3 | 2 | 120Mbps | 741-6 |
| 4 | 1 | * | 741-7 |
| 4 | 2 | * | 741-8 |

FIG. 12

OUTPUT PORT GROUP TABLE 750

| OUTPUT PORT NUMBER | OUTPUT PORT GROUP NUMBER | |
|---|---|---|
| 1 | 1 | 751-1 |
| 2 | 2 | 751-2 |
| 3 | 3 | 751-3 |
| 4 | 3 | 751-4 |

FIG. 15
BANDWIDTH POLICY STORE UNIT 2440

| OUTPUT PORT GROUP NUMBER | CLASS | MINIMUM BANDWIDTH | MAXIMUM BANDWIDTH | |
|---|---|---|---|---|
| 1 | 1 | 20Mbps | 50Mbps | 2441-1 |
| 1 | 2 | 50Mbps | 80Mbps | 2441-2 |
| 2 | 1 | 30Mbps | 50Mbps | 2441-3 |
| 2 | 2 | 30Mbps | 100Mbps | 2441-4 |
| 3 | 1 | 70Mbps | 150Mbps | 2441-5 |
| 3 | 2 | 70Mbps | 150Mbps | 2441-6 |
| 4 | 1 | * | * | 2441-7 |
| 4 | 2 | * | * | 2441-8 |

FIG. 16
PACKET TRANSMISSION CONTROL TABLE 2520

| OUTPUT PORT GROUP NUMBER | CLASS | PACKET TRANSMISSION TIME FOR MINIMUM BAND WIDTH | PACKET TRANSMISSION TIME FOR MAXIMUM BAND WIDTH | |
|---|---|---|---|---|
| 1 | 1 | 5 | 3 | 2521-1 |
| 1 | 2 | 4 | 3 | 2521-2 |
| 2 | 1 | 6 | 5 | 2521-3 |
| 2 | 2 | 7 | 6 | 2521-4 |
| 3 | 1 | 8 | 7 | 2521-5 |
| 3 | 2 | 3 | 1 | 2521-6 |
| 4 | 1 | * | * | 2521-7 |
| 4 | 2 | * | * | 2521-8 |

FIG. 18

OUTPUT PORT NUMBER TABLE 1600

| OUTPUT TABEL GROUP NUMBER | OUTPUT PORT NUMBER | | OUTPUT LABEL | |
|---|---|---|---|---|
| 1 | 1 | 2 | 5 | 6 |
| 2 | 2 | 3 | 7 | 8 |
| 3 | 3 | 4 | 9 | 10 |
| 4 | * | * | * | * |

1610-1, 1610-2, 1610-3, 1610-4

PACKET READ UNIT 1550

PACKET TRANSMISSION CONTROL TABLE 1620

FIG. 21

FIFO CONTROL TABLE 1630

| OUTPUT PORT NUMBER | OUTPUT LABEL GROUP NUMBER | THE NUMBER OF STORED PACKETS | |
|---|---|---|---|
| 1 | 1 | 4 | 1631-1 |
| 1 | 2 | 0 | 1631-2 |
| 1 | 3 | 0 | 1631-3 |
| 2 | 1 | 7 | 1631-4 |
| 2 | 2 | 3 | 1631-5 |
| 2 | 3 | 0 | 1631-6 |
| 3 | 1 | 0 | 1631-7 |
| 3 | 2 | 3 | 1631-8 |
| 3 | 3 | 6 | 1631-5 |
| 4 | 1 | 0 | 1631-6 |
| 4 | 2 | 0 | 1631-7 |
| 4 | 3 | 1 | 1631-8 |

FIG. 22

BANDWIDTH POLICY STORE UNIT 1640

| OUTPUT LABEL GROUP NUMBER | MAXIMUM BANDWIDTH | |
|---|---|---|
| 1 | 20Mbps | 1641-1 |
| 2 | 30Mbps | 1641-2 |
| 3 | 40Mbps | 1641-3 |
| 4 | 50Mbps | 1641-4 |

FIG. 23

OUTPUT LABEL GROUP TABLE 1650

| OUTPUT PORT NUMBER | OUTPUT LABEL GROUP NUMBER | | | |
|---|---|---|---|---|
| 1 | 1 | * | * | 1651-1 |
| 2 | 1 | 2 | 2 | 1651-2 |
| 3 | 2 | 3 | 3 | 1651-3 |
| 4 | 3 | * | * | 1651-4 |

FIG. 25 shaper LA_group1 Class1 {peak_rate 20Mbps}
shaper LA_group1 Class2 {peak_rate 80Mbps}
shaper LA_group2 Class1 {peak_rate 50Mbps}
shaper LA_group2 Class2 {peak_rate 100Mbps}
shaper LA_group3 Class1 {peak_rate 40Mbps}
shaper LA_group3 Class2 {peak_rate 120Mbps}

2201    2202                    2203

FIG. 32 flow1 1 any any any any  2  any any any any any flow_group 1
flow2 1 any any any any  3  any any any any any flow_group 1
flow3 1 any any any any  4  any any any any any flow_group 1 flow4 1 any any any any any any any any  1 any flow_group 1

3501  3502  3504  3506  3510  3512           3508
  3509  3503  3505  3507  3511  3513

FIG. 33 flow1 1 10.10.10. * 10.10.40 * any any 2 any any any  flow_group 2
flow2 1 10.10.20. * 10.10.40 * any any 3 any any any  flow_group 2
flow3 1 10.10.30. * 10.10.40 * any any 4 any any any  flow_group 2

3501 3509        3503      3505  3507  3511       3508
     3502              3504    3506   3510 policing flow_group 1 {max_rate 100Mbps burst 20kbyte dscp 5 penalty_dscp 6}
         3701              3702          3703      3704       3705

PACKET FORWARDING APPARATUS WITH QOS CONTROL

INCORPORATION BY REFERENCE

The present application claims priority from Japanese application JP2005-255819 filed on Sep. 5, 2005 and JP2006-019979 filed on Jan. 30, 2006, the content of which is hereby incorporated by reference into this application.

BACKGROUND OF THE INVENTION

1. Field of the Invention

The present invention relates to a packet forwarding apparatus having a shaping function and a bandwidth monitoring function for controlling the bandwidth of packets flowing over a network.

2. Description of the Related Art

A packet communication system used in the IP network allows a great number of users to share the same port, enabling reduction in cost per bandwidth. Because of such low cost of the packet communication system, there is a tendency to use the IP network to realize the telephone network or business network of each company conventionally implemented with a dedicated network. As such, the IP network is required to guarantee the Quality of Service (QoS) for voice data and mission critical data and to ensure High Availability, as conventionally implemented by the dedicated network.

To guarantee the QoS for the voice data and mission critical data, a packet forwarding apparatus constituting the IP network needs to have a QoS control function. For example, a shaping function is known as such QoS control function. JP-A-6-315034 (:Japanese Unexamined Patent Publication No. 6-3135034) describes a shaping apparatus for performing the shaping function. The shaping apparatus described therein has a queue for storing packets of fixed length, or cells, for each connection (VC (Virtual Connection)), and transmits the packets from the queue at a bandwidth preset for each VC, to thereby guarantee the bandwidth of each VC. The administrator of the IP network can guarantee the QoS for the voice data and mission critical data by, for example, arranging the shaping apparatus adopting such technique at a port suffering from heavy traffic load and by allocating the VC for the those data to thereby guarantee the bandwidth.

WFQ (Weighted Fair Queuing) is known as another shaping apparatus. A shaping apparatus of WFQ based on an algorithm called SCFQ (Self Clocked Fair Queuing) is described in S. Golestani, "A Self-Clocked Fair Queuing Scheme for Broadband Applications", In proc. of INFOCOM '94, pp. 636-646, 1994. The shaping apparatus described therein controls a plurality of sessions k (k=1 to N), with weight Wk set for each session k. When a packet p_k_i arrives at the shaping apparatus, it stores the packet p_k_i in the queue, and at the same time, calculates a variable F_k_i of each packet p_k_i based on the following expression:

$$F\_k\_i = L\_k\_i/Wk + \max(F\_(k-1)\_i, V(ta\_k\_i)),$$

where L_k_i represents a packet length of packet p_k_i, ta_k_i represents the arrival time of packet p_k_i, and V(t) represents a function for returning the value of F_k_i of the packet output from the queue at time t. At the time of outputting a packet, packet p_k_i having the smallest F_k_i is output to thereby implement packet output proportional to weight Wk of each session. The administrator of the IP network can guarantee the QoS for voice data and mission critical data by, for example, allocating one session k for the data to guarantee the bandwidth corresponding to (Wk/total sum of Wk)×port bandwidth.

As another QoS control function, a bandwidth monitoring function is known, which is described, e.g., in "Traffic Management Specification version 4.0, Chapter 4.5", ATM Forum Technical Committee. In the CBR (Constant Bit Rate) service described therein, the maximum bandwidth (PCR: Peak Cell Rate) is contracted between networks, and the bandwidth monitoring function monitors the received cells at the maximum bandwidth, and discards any cell decided to be "non-conformant" to the contract. The administrator of the IP network can guarantee the QoS for voice data and mission critical data of a specific user by, for example, limiting the data bandwidth for each user by means of the bandwidth monitoring function provided at a node at the entrance of the network, to thereby eliminate an influence of data of one user on voice data and mission critical data of another user.

Meanwhile, as means for ensuring High Availability in the switches, a link aggregation technique for handling a plurality of physical ports (physical links) as one logical Link Aggregation Group and enabling the Link Aggregation Group to be treated as if it were a single physical port is described in "Link Aggregation according to IEEE standard 802.3ad" (refer to http://www.itworld.com/Net/1750/NWW001113tech/pfindex.html). With this technique, even if one physical port in the Link Aggregation Group is in failure, at least one physical port remains normal, which prevents interruption in communication between switches connected via the Link Aggregation Group. Thus, the administrator of the IP network can improve availability of the network by changing the single port connecting the switches to a plurality of ports aggregated by the Link Aggregation.

Further, as means for ensuring High Availability in a MPLS (Multi Protocol Label Switching) network where paths called LSP (Label Switching Paths) are set, a Fast Rerouting technique is described in "Fast Reroute Extensions to RSVP-TE for LSP Tunnels", IETF RFC 4090. The document describes a one-to-one backup method system and a facility backup method system for protecting traffic over the LSP. In the one-to-one backup method system, one backup LSP is set corresponding to a LSP to be protected (hereinafter referred to as "protected LSP"). In the facility backup method system, one backup LSP is set for a plurality of protected LSP. When a failure occurs in the protected LSP, the traffic on the relevant LSP is detoured to the backup LSP. The administrator of the IP network can improve the availability of the network by setting a backup LSP for a protected LSP to enable such detour at the time of failure of the protected LSP.

SUMMARY OF THE INVENTION

The shaping apparatuses in JP-A-6-315034 and S. Golestani, "A Self-Clocked Fair Queuing Scheme for Broadband Applications", In proc. of INFOCOM '94, pp. 636-646, 1994 described above are intended to control packet output to a single port, which do not take account of control of packet output to a plurality of ports. Thus, the shaping apparatus adopting the technique of JP-A-6-315034 or S. Golestani, "A Self-Clocked Fair Queuing Scheme for Broadband Applications", In proc. of INFOCOM '94, pp. 636-646, 1994 cannot control the total entire bandwidth of the packets to be output to the Link Aggregation Group described in Link Aggregation according to IEEE standard 802.3ad (see http://www.itworld-.com/Net/1750/NWW001113tech/pfindex.html). This means that Therefore, a problem occurs in which the QoS for voice data and mission critical data may might not be guaranteed in the IP network formed of switches adopting the Link Aggregation technique.

In the network adopting the Fast Reroute technique described in "Fast Reroute Extensions to RSVP-TE for LSP Tunnels", IETF RFC 4090, i.e., "Fast Reroute Extensions to RSVP-TE for LSP Tunnels", IETF RFC 4090, the packet forwarding apparatus may transmit packets to a protected LSP and a backup LSP that are set for different output ports. Since the shaping apparatus adopting the technique of JP-A-6-315034 or "A Self-Clocked Fair Queuing Scheme for Broadband Applications", In proc. of INFOCOM '94, pp. 636-646, 1994, i.e., JP-A-6-315034 or S. Golestani, "A Self-Clocked Fair Queuing Scheme for Broadband Applications", In proc. of INFOCOM '94, pp. 636-646, 1994 does not take account of control of the packet output to a plurality of ports, it cannot control the total entire bandwidth of the packets on the protected LSP and its corresponding backup LSP. Thus, in the IP network formed of the switches adopting the Fast Reroute technique, a problem occurs in which the QoS for voice data and mission critical data may not be guaranteed.

Similarly, the bandwidth monitoring function of "Traffic Management Specification version 4.0, Chapter 4.5", ATM Forum Technical Committee, i.e., "Traffic Management Specification version 4.0, Chapter 4.5", ATM Forum Technical Committee assumes control of packets input from a single port and packets output to a single port, without taking into consideration the packets input from a plurality of ports or the packets output via a plurality of ports. Thus, the bandwidth monitoring function adopting the technique of "Traffic Management Specification version 4.0, Chapter 4.5", ATM Forum Technical Committee cannot control the total bandwidth of the packets input via the Link Aggregation Group or the packets output to the Link Aggregation Group described in Link Aggregation according to IEEE standard 802.3ad, i.e., Link Aggregation according to IEEE standard 802.3ad (see http://www.itworld.com/Net/1750/NWW001113tech/pfindex.html). Thus, a problem is encountered in which the QoS for voice data and mission critical data may might not be guaranteed in the IP network formed of switches adopting the Link Aggregation technique.

Still further, in the network adopting the Fast Reroute technique described in "Fast Reroute Extensions to RSVP-TE for LSP Tunnels", IETF RFC 4090, i.e., "Fast Reroute Extensions to RSVP-TE for LSP Tunnels", IETF RFC 4090, the packet forwarding apparatus may receive packets from or output packets to a protected LSP and a backup LSP set for different output ports. Since the bandwidth monitoring function adopting the technique of "Traffic Management Specification version 4.0, Chapter 4.5", i.e., "Traffic Management Specification version 4.0, Chapter 4.5", ATM Forum Technical Committee does not take account of the packets input from a plurality of ports or the packets output to a plurality of ports, it cannot control the total bandwidth of the packets input from the protected LSP and the backup LSP or packets output to the protected LSP and the backup LSP. Thus, in the IP network formed of switches adopting the Fast Reroute technique, there is such a problem that the QoS for voice data and mission critical data may might not be guaranteed.

Thus, in order to solve the above-described problems, the present invention provides, for example, a packet forwarding apparatus for distributing packets received from a physical port to be transmitted over a plurality of physical ports, which includes a transmitting/receiving unit for transmitting/receiving packets via a physical port, a port group decision unit for deciding a port group corresponding to a plurality of physical ports, and a port group control unit for controlling flow of packets for each port group decided by the port group decision unit.

The other problems to be solved by the present invention and the means for solving them will become apparent from the following description of the preferred embodiments of the present invention when taken in conjunction with accompanying drawings.

For example, adopting the above-described solution makes it possible to control the total bandwidth of the packets input from a plurality of ports or packets output to a plurality of ports.

BRIEF DESCRIPTION OF THE DRAWINGS

FIG. 8 shows a configuration example of an output port number table 600.

FIG. 9 shows a configuration example of a packet transmission control table 720.

FIG. 10 shows a configuration example of a FIFO control table 730.

FIG. 11 shows a configuration example of a bandwidth policy store unit 740.

FIG. 12 shows a configuration example of an output port group table 750.

FIG. 15 shows a configuration example of a bandwidth policy store unit 2440.

FIG. 16 shows a configuration example of a packet transmission control table 2520.

FIG. 18 shows a configuration example of an output port number table 1600.

FIG. 21 shows a configuration example of a FIFO control table 1630.

FIG. 22 shows a configuration example of a bandwidth policy store unit 1640.

FIG. 23 shows a configuration example of an output label group table 1650.

FIG. 25 shows an example of a command for setting a bandwidth policy store unit.

FIG. 32 shows an example of a command for setting flow table 3002 and flow bundle table 3202.

FIG. 33 shows another example of a command for setting flow table 3002 and flow bundle table 3202.

DESCRIPTION OF THE EMBODIMENTS

Hereinafter, preferred embodiments of the present invention will be described with reference to FIGS. 1-37, although the present invention is not limited thereto.

First Embodiment

Router Having Shaping Function (1) General Operation of Router

Firstly, a general operation of a packet forwarding apparatus 200 having a shaping function of the present embodiment will be described.

Figure 1:
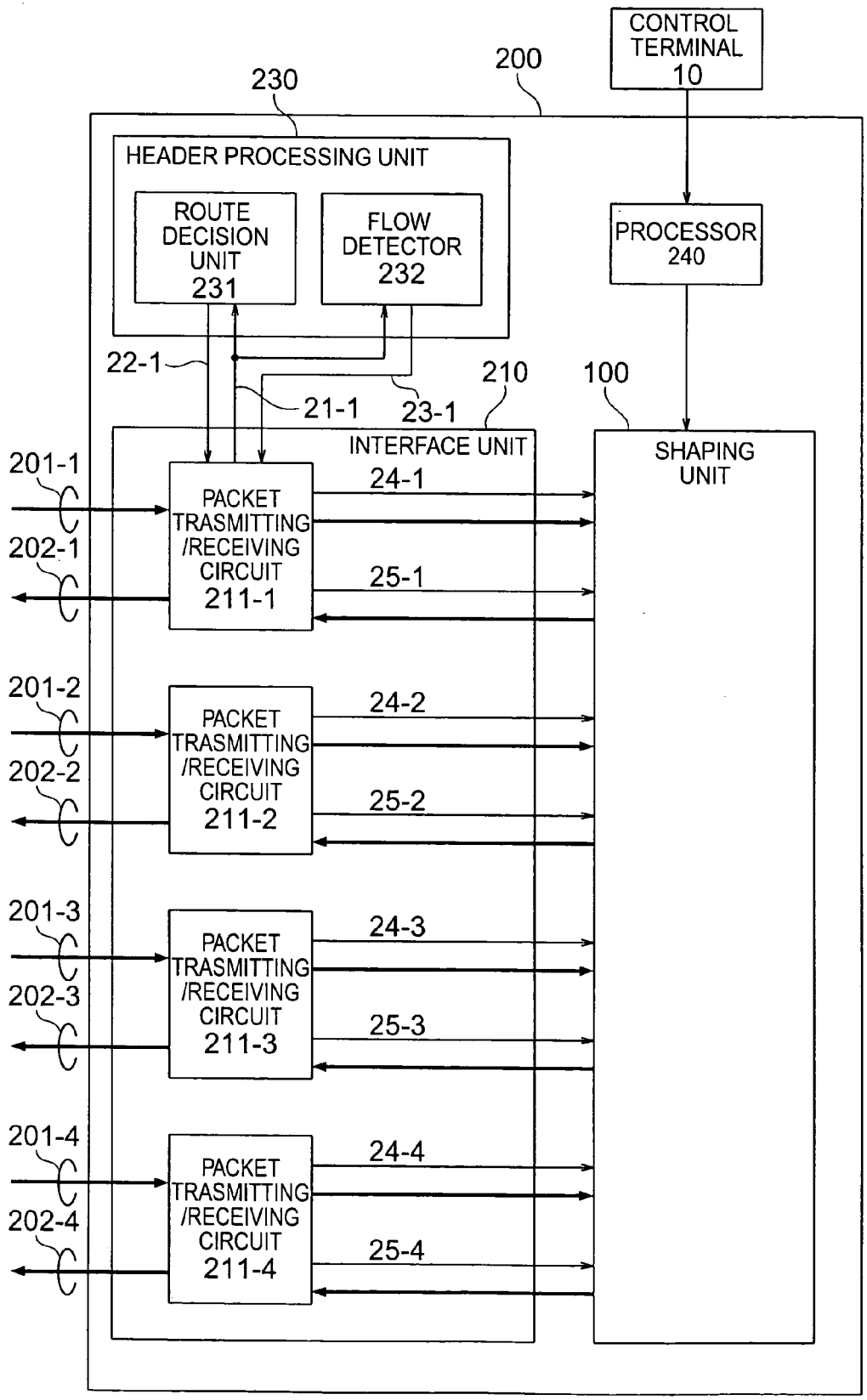
FIG. 1 shows an example of a configuration of a packet forwarding apparatus 200.

FIG. 1 shows a configuration example of packet forwarding apparatus 200 of the present embodiment. Packet forwarding apparatus 200 includes N input ports 201-*i* (i=1 to N) via which packets are input, N output ports 202-*i* (i=1 to N), an interface unit 210, a shaping unit 100 that is peculiar to the present embodiment and performs storage of packets as well as shaping, a header processing unit 230, and a processor 240. Although description is made about the case where N is 4 in the present embodiment, N may take another value. Interface unit 210 includes N packet transmitting/receiving circuits 211-*i* (i=1 to N) that perform transmitting/receiving processing of packets corresponding to respective input ports 201-*i*. Header processing unit 230 includes a route decision unit 231, and a flow detector 232 that decides a class of QoS (hereinafter, simply referred to as "class") to which a packet belongs, based on its header information or the like. Although FIG. 1 shows that only packet transmitting/receiving circuit 211-1 is connected to header processing unit 230, all packet transmitting/receiving circuits 211-*i* are connected to header processing unit 230. It is noted that the class does not need to represent the QoS itself. It may represent a type of the packet (voice=VoIP or video, for example), or an order of priority.

Figure 2:
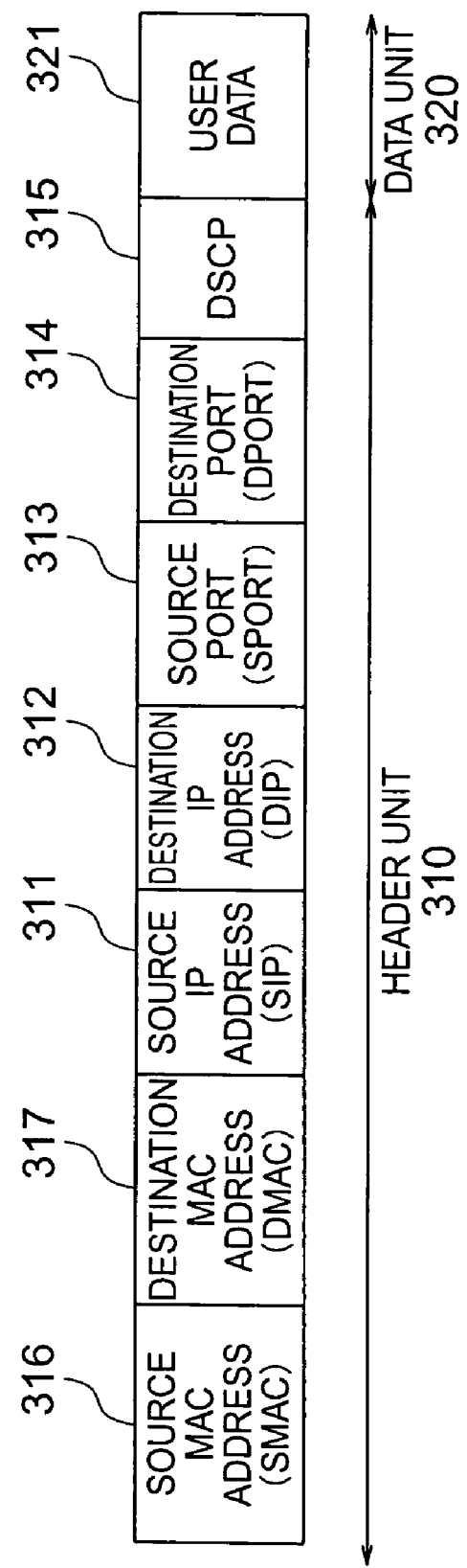
FIG. 2 shows an example of a format of a packet transmitted/received by packet forwarding apparatus 200.

FIG. 2 shows an example of a format of a packet input via input port 201-*i*. The format includes a header unit 310 and a data unit 320. Header unit 310 is formed of a Source MAC Address (hereinafter, referred to as "SMAC") 316 corresponding to a source address in the data link layer, a Destination MAC Address (hereinafter, referred to as "DMAC") 317 corresponding to a destination address, a Source IP Address (hereinafter, referred to as "SIP") 311 corresponding to a source address (address of a transmitting terminal) in the network layer, a Destination IP Address (hereinafter, referred to as "DIP") 312 corresponding to a destination address (address of a receiving terminal), a Source Port (hereinafter, referred to as "SPORT") 313 and a Destination Port (hereinafter, referred to as "DPORT") 314 that represent a protocol (=Application), and a DSCP 315 that represents transmission priority in the network. Data unit 320 includes user data 321.

Figure 3:
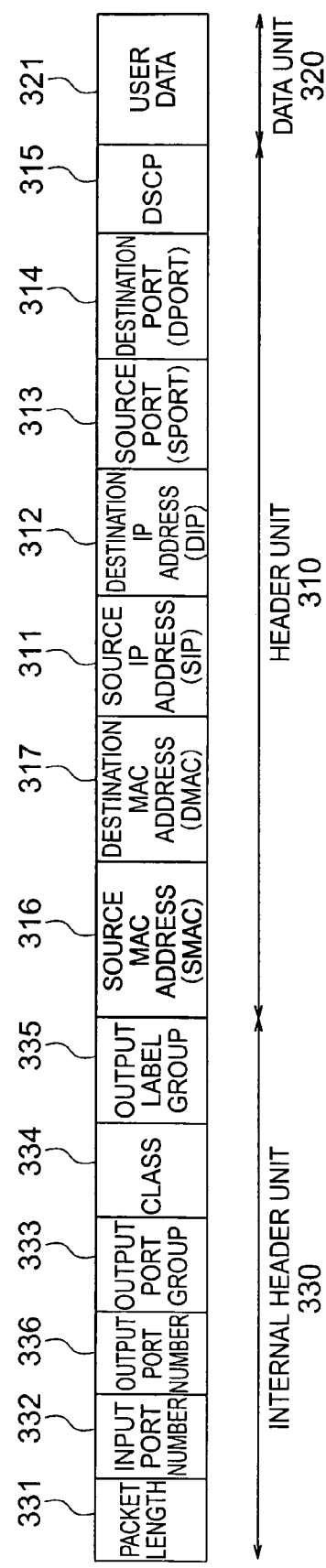
FIG. 3 shows an example of a format of the packet in packet forwarding apparatus 200.

FIG. 3 shows an example of a format of the packet inside packet forwarding apparatus 200. The format includes an internal header unit 330 in addition to the format shown in FIG. 2. Internal header unit 330 is formed of a packet length 331 that represents a byte length of the input packet, an input port number 332 corresponding to the number of the input port via which the packet was input, an output port number 336 corresponding to the number of the output port for the packet, an output port group 333 corresponding to the number of the output port group for the packet, a class 334 of the packet, and an output label group 335 of the packet. The output port group and the output label group will be described later. The output port group and the output label group may collectively be referred to as an output group.

Figure 4:
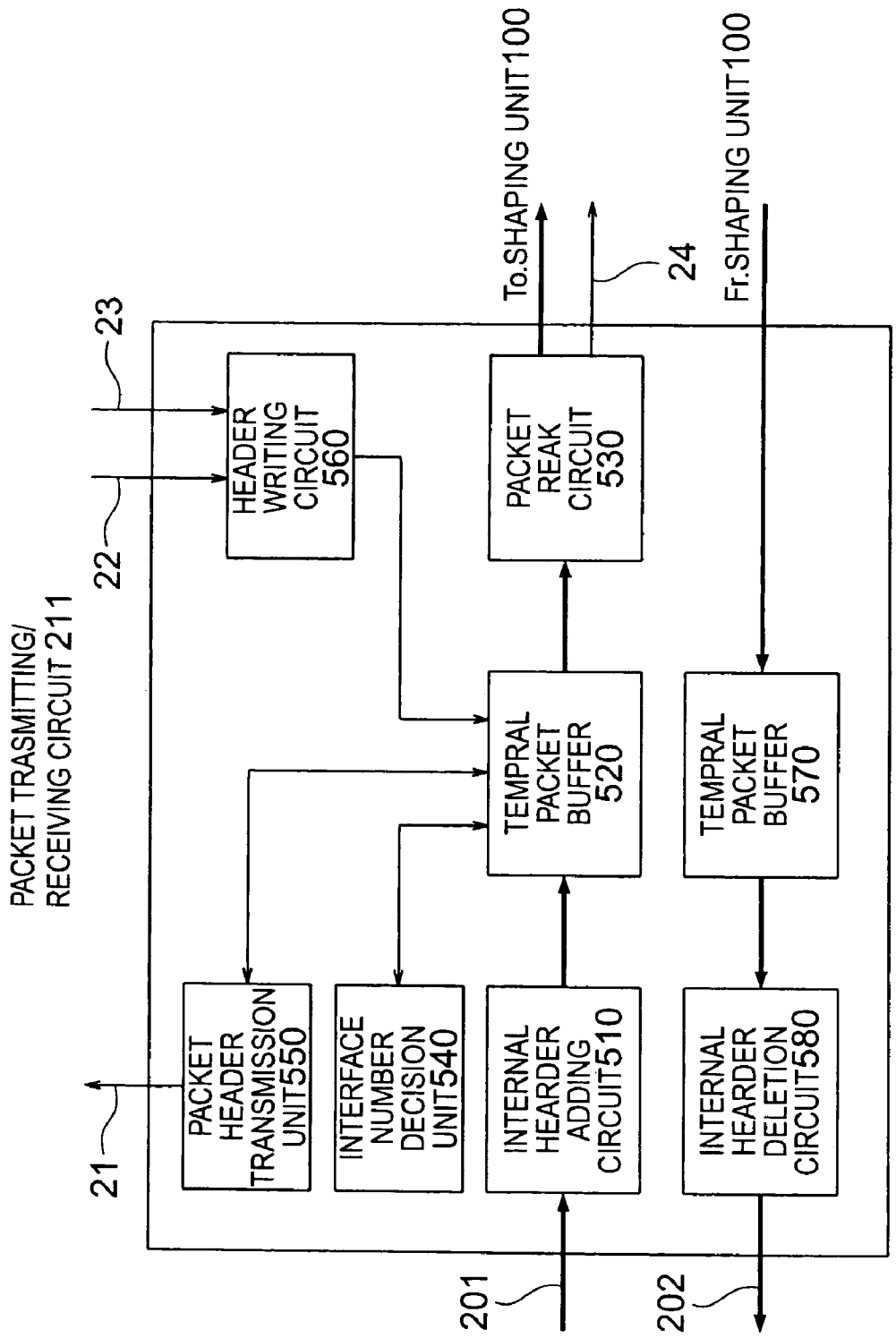
FIG. 4 shows a configuration example of a packet transmitting/receiving circuit 211.

Hereinafter, a flow from the time when a packet is input via input port 201 to the time when it is delivered to output port 202 will be described. When a packet is input via input port 201, an internal header adding circuit 510 of packet transmitting/receiving circuit 211, details of which are shown in FIG. 4, adds internal header unit 330 to the packet. It also counts the byte length of the packet and writes it in packet length 331, writes the number of input port 201 via which the packet was received in input port number 332, and stores the resultant packet in a temporal packet buffer 520.

Further, a packet header transmission unit 550 transmits information of header unit 310 and internal header unit 330 of the packet stored in temporal packet buffer 520 as packet header information 21 to route decision unit 231 and flow detector 232 of header processing unit 230. At this time, output port number 336, output port group 333, class 334, and output label group 335 contain meaningless values.

Route decision unit 231 decides the number of the output port group (referred to as the "output port group number") from the information of DIP or DMAC included in the received packet header information 21, and transmits it as packet output port information 22 to packet transmitting/receiving circuit 211. Herein, the output port group refers to a set of candidates of the output ports via which the packet is to be output. In the case where packet forwarding apparatus 200 performs Link Aggregation, the output port group corresponds to the Link Aggregation Group. In the case where the apparatus performs Fast Reroute, it corresponds to two output ports containing a protected LSP and its backup LSP.

Flow detector 232 of header processing unit 230 decides the class of the packet based on the received packet header information 21, and transmits it as packet class information 23 to packet transmitting/receiving circuit 211.

A header writing circuit 560 of packet transmitting/receiving circuit 211, upon receipt of packet output port information 22 and packet class information 23, writes the received information into the respective fields of output port group 333 and class 334 of the packet within temporal packet buffer 520. Further, a packet read circuit 530 in FIG. 4 reads the packet from temporal packet buffer 520 and transmits it to shaping unit 100 together with a packet transmission signal 24.

Figure 5:
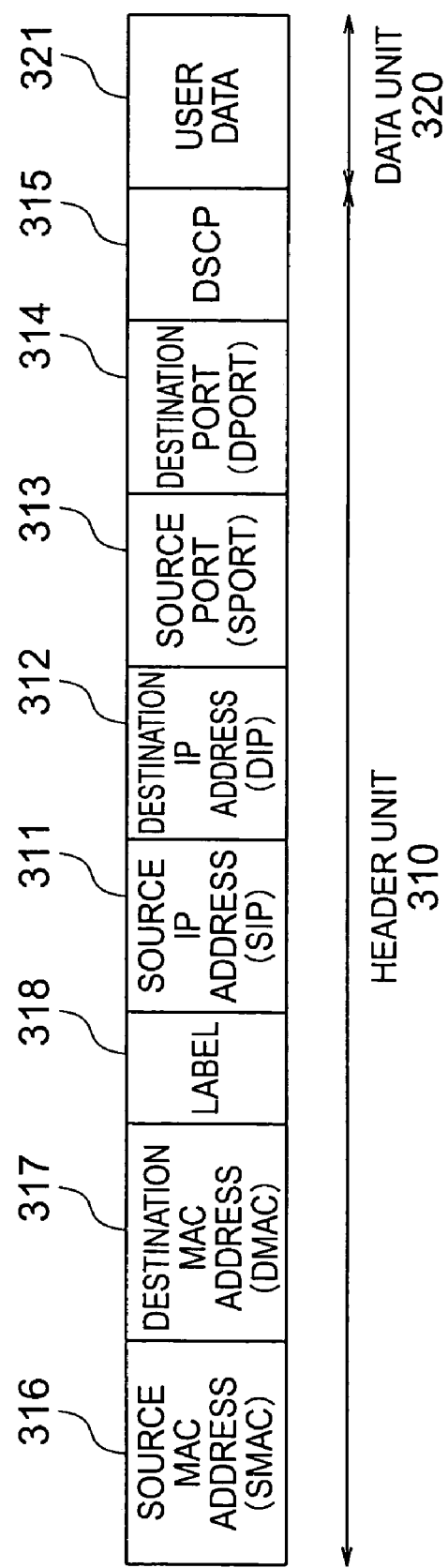
FIG. 5 shows an example of a format of a MPLS packet transmitted/received by packet forwarding apparatus 200.
Figure 6:
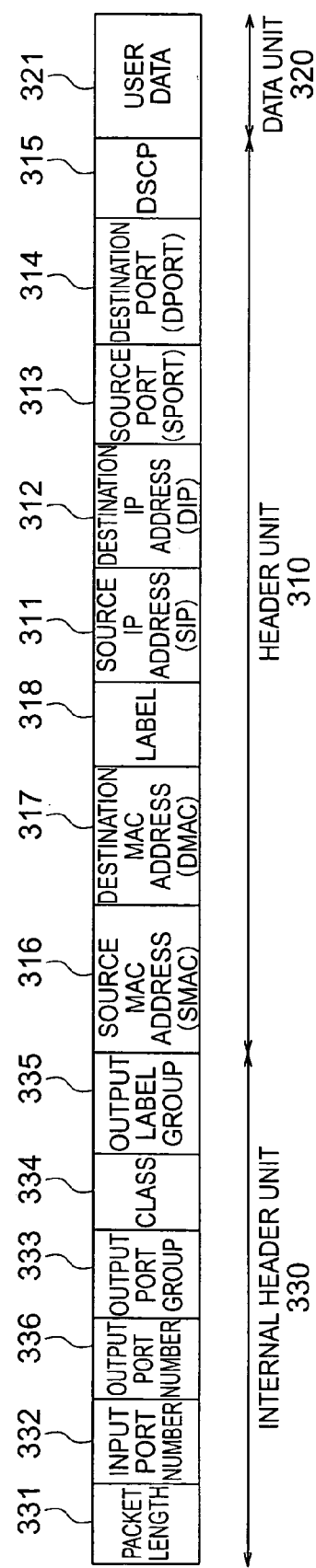
FIG. 6 shows an example of a format of the MPLS packet in packet forwarding apparatus 200.

While the format example of a packet in the network other than the MPLS network and the format example of the same packet in packet forwarding apparatus 200 have been described in conjunction with FIGS. 2 and 3, a format example of a packet in the MPLS network (referred to as the "MPLS packet") and a format example of the same packet in packet forwarding apparatus 200 are shown in FIGS. 5 and 6, respectively. These formats differ from those in FIGS. 2 and 3 in that a label 318 is added thereto. In this case, route decision unit 231 in FIG. 1 decides the number of the output label group (referred to as the "output label group number") from input port number 332 and label 318 included in the received packet header information 21. Herein, the output label group corresponds to a set of a protected LSP and its backup LSP. Further, route decision unit 231 transmits the information as packet output port information 22 to packet transmitting/receiving circuit 211. Header writing circuit 560 in packet transmitting/receiving circuit 211 writes the output label group number included in packet output port information 22 and the class included in packet class information 23 to output label group 335 and class 334, respectively.

Shaping unit 100 includes a FIFO (First In First Out) (queue) for each output port 202 and for each class in the case of controlling the bandwidth of transmission for each class provided in each output port group. Upon receipt of a packet from packet transmitting/receiving circuit 211, shaping unit 100 decides an ultimate output port from among the candidates of output ports constituting the output port group (set in the output port group 333 field), based on at least one item of the information within header unit 310. Shaping unit 100 then stores the packet in the FIFO that is decided by the relevant output port and class 334 in internal header unit 330. Shaping unit 100 transmits the packet to packet transmitting/receiving circuit 211 corresponding to the output port, while controlling the bandwidth of the packets to be transmitted for each class belonging to the output port group.

Meanwhile, in the case of collectively controlling the transmission bandwidth of the protected LSP and the backup LSP across a plurality of output ports, the shaping unit includes a FIFO for each output label group. Upon receipt of a packet from packet transmitting/receiving circuit 211, the shaping unit decides one LSP label (referred to as the "output label") and an ultimate output port from among the LSP belonging to the output label group and the output ports to which the LSP are set, based on at least one item of the information included in header unit 310. Further, it writes the decided output label to label 318 of header unit 310, and stores the packet in the FIFO that is decided by the output port and output label group 335. Shaping unit 100 transmits the packet to packet transmitting/receiving circuit 211 corresponding to the output port, while controlling the bandwidth of the packets to be transmitted for each output label group.

Packet transmitting/receiving circuit 211 temporarily stores the received packet in a temporal packet buffer 570. An internal header deleting circuit 580 deletes internal header unit 330 therefrom. The resultant packet is then transmitted to output port 202.

(2) Detailed Operations in the Case of Controlling the Bandwidth of Transmission for Each Class Provided in the Output Port Group Hereinafter, detailed operations in the case where shaping unit 100 specific to the present embodiment controls the transmission bandwidth for each class included in the output port group will be described. In the following embodiment, the case where the number of classes is two will be described, although it is not restricted thereto.

Figure 7:
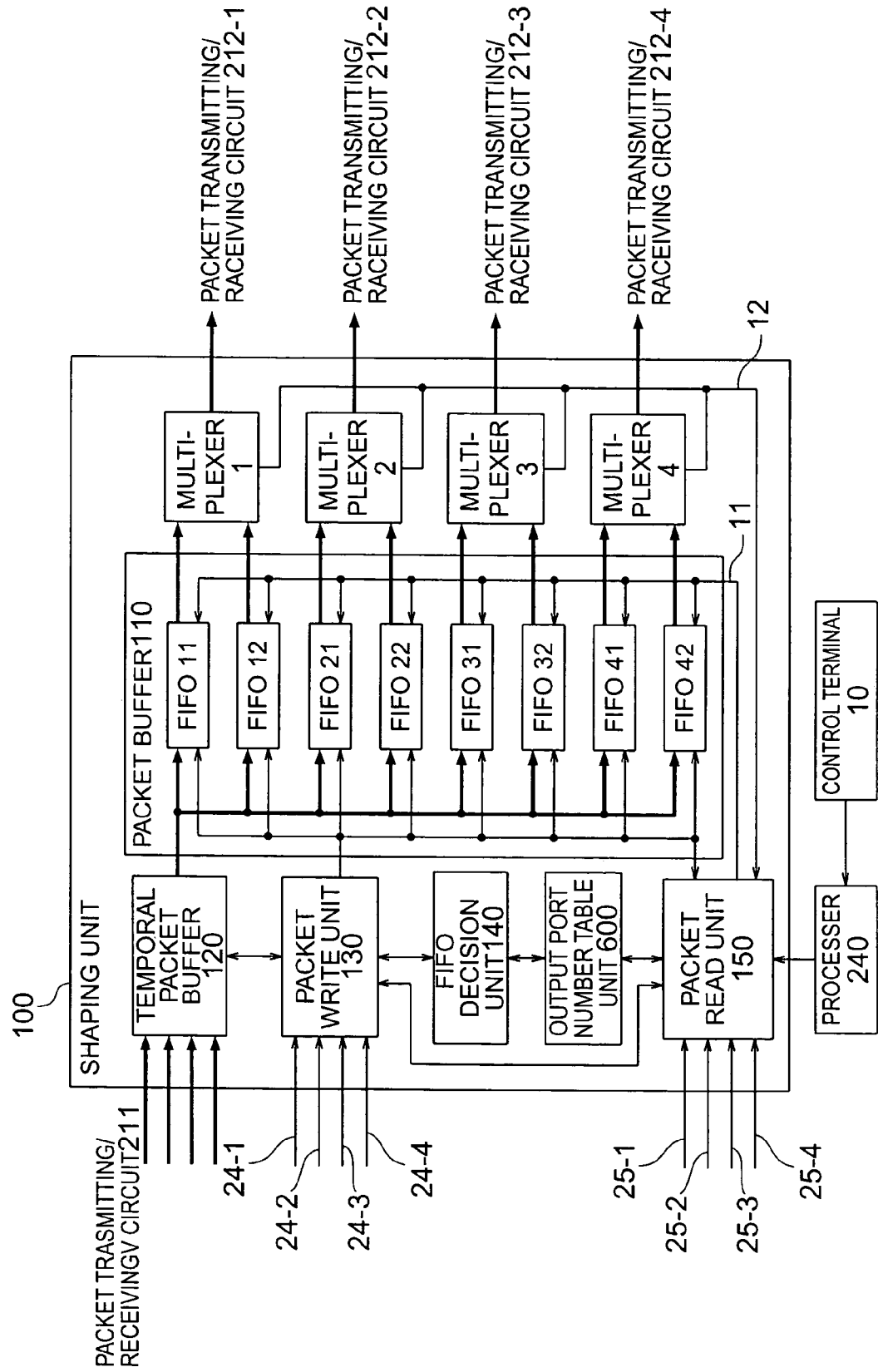
FIG. 7 shows a configuration example of a shaping unit 100.

FIG. 7 is a block diagram showing a first configuration example of the shaping unit. Shaping unit 100 includes a packet buffer 110 that has a plurality of FIFO for storing packets corresponding to respective classes of respective output ports, a temporal packet buffer 120 for temporarily storing a packet, a FIFO decision unit 140 for deciding the FIFO to which the packet is to be stored, a packet write unit 130, a packet read unit 150, an output port number table 600, and multiplexers 1-4 corresponding to the respective output ports. In the case where the number of output ports is four and the number of classes is two, packet buffer 110 includes four sets of FIFO i1 and FIFO i2 corresponding to each transmitting/receiving circuit 212-$i$ (i.e., eight FIFO in total).

When shaping unit 100 receives a packet from packet transmitting/receiving circuit 211, temporal packet buffer 120 stores the packet. Next, packet write unit 130 reads information of header unit 310 and internal header unit 330 of the packet stored in temporal packet buffer 120, and transmits the information to FIFO decision unit 140. FIFO decision unit 140 decides one or more candidates of output port numbers corresponding to output port group 333 in internal header unit 330 (see FIGS. 3 and 6), and selects and transmits one output port number from among the candidates to packet write unit 130.

To decide the candidates of the output port numbers, for example, FIFO decision unit 140 refers to an output port number table 600 shown in FIG. 8. Output port number table 600 includes entries 610-$i$ (i=1 to 4), each can list four output port numbers, corresponding to the respective output port groups. When entry 610-$i$ stores less than four output port numbers, it stores the valid output port number(s) from the left side thereof. Here, description will be made about the case where output port group 1 includes output port 1, output port group 2 includes output port 2, and output port group 3 includes output ports 3 and 4. The symbol "*" in the table represents that no valid value is set. FIFO decision unit 140 may read output port number table 600 using output port group 333 as an address, and decide the read information as the candidates of the output port numbers.

To decide one output port number from among the candidates of the output port numbers, for example, four Hash functions H4($x$), H3($x$), H2($x$), and H1($x$) may be employed. H4($x$) outputs one integer selected from 1 to 4 as the Hash value for an argument x, H3($x$) outputs one integer selected from 1 to 3, H2($x$) outputs one integer of 1 or 2, and H1($x$) outputs 1. The output port numbers in entry 610 correspond to Hash values 1, 2, 3 and 4 in this order from the leftmost column.

FIFO decision unit 140 selects Hash function Hh(x) corresponding to 'h' that is the number of valid output port groups obtained by referring to output port number table 600. For example, Hash function H1($x$) is selected for output port group 1 or 2, and Hash function H2($x$) is selected for output port group 3. Further, the value of Hh(x) is calculated using as the argument x the value formed from at least one item of the information included in header unit 310 received from packet write unit 130. For example, information connecting SIP 311, DIP 312, SPORT 313 and DPORT 314 may be a value of argument x, although it is not restricted thereto. Lastly, FIFO decision unit 140 may decide the candidate of the output port number corresponding to the Hash value as the ultimate output port number.

Upon receipt of the ultimate output port number, packet write unit 130 instructs temporal packet buffer 120 to transmit the stored packet to packet buffer 110. Packet write unit 130 transmits the ultimate output port number and class 334 within internal header unit 330 to packet buffer 110, and transmits the ultimate output port number, and class 334 and output port group 333 within internal header unit 330 to packet read unit 150. The FIFOij (i is the ultimate output port number, and j corresponds to class 334) corresponding to the ultimate output port number and the class within internal header unit 330 stores the packet received from temporal packet buffer 120.

Packet read unit 150 manages/controls packet reading from packet buffer 110 for each class of output port group 333. It decides the output port number to which the packet is to be transmitted and the class, and transmits the information to packet buffer 110. Although the number of classes is two in the present embodiment, there may be only one class or three or more classes. If the number of classes is one, the output packets are controlled for each output port group.

Figure 13:
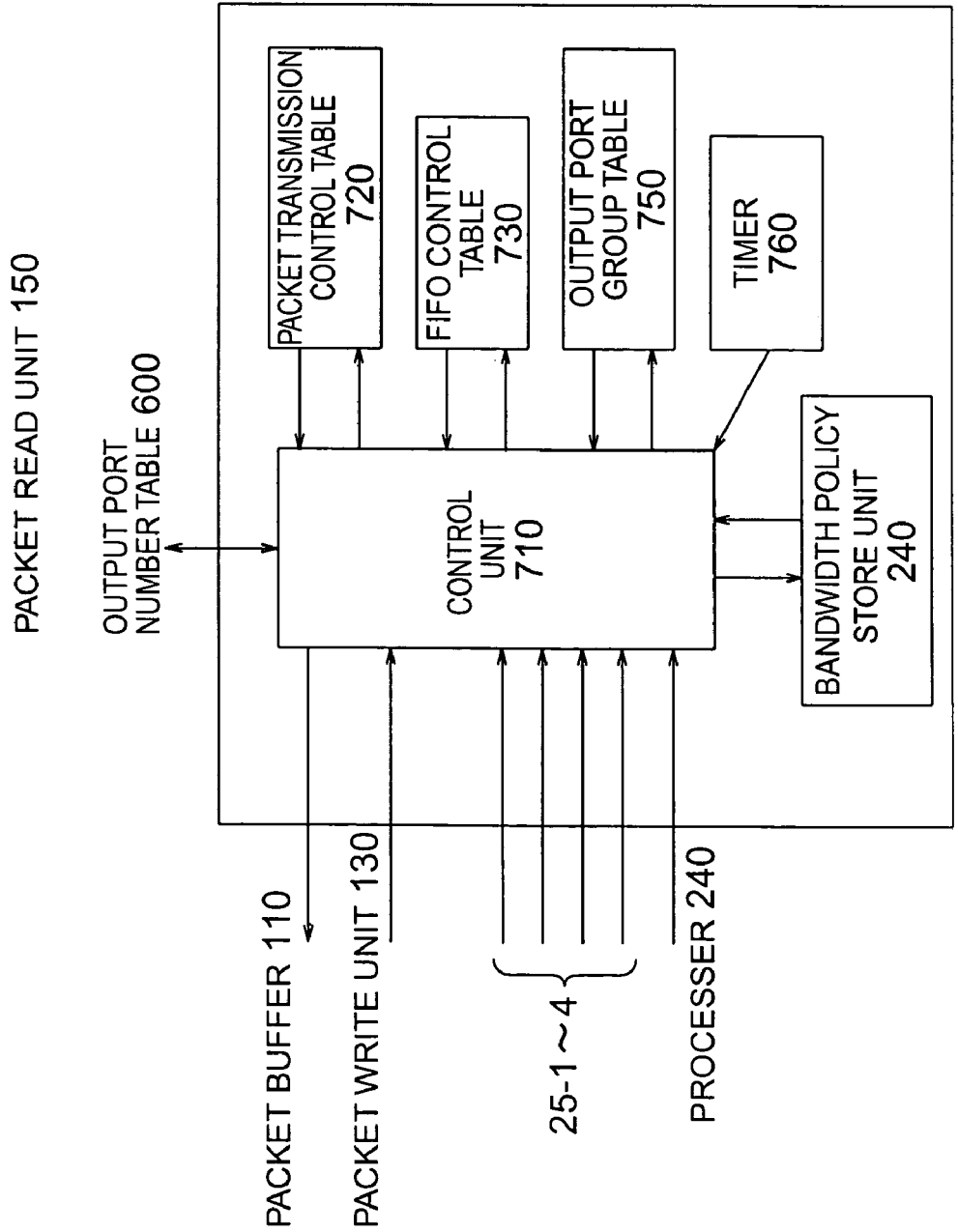
FIG. 13 shows a configuration example of a packet read unit 150.

FIG. 13 shows an example for implementing constitution of packet read unit 150. Packet read unit 150 includes a control unit 710, a packet transmission control table 720 for storing control information for packet transmission for each class of the output port group, a FIFO control table 730 for storing the number of packets stored in FIFOij for each class of the output port, a bandwidth policy store unit 740 for storing policies such as limited bandwidth and bandwidth allocation for each class, an output port group table 750, and a timer 760.

FIGS. 9 and 10 show examples for implementation of packet transmission control table 720 and FIFO control table 730, respectively. Packet transmission control table 720 in FIG. 9 stores a transmission time of the next packet (referred to as the "packet transmission time") for each class of each output port group number. FIFO control table 730 in FIG. 10 includes an entry 731 for storing the number of stored packets in FIFOij for each class of each output port number. For example, entry 731-3 indicates that FIFO 21 for class 1 of output port 2 stores six packets.

FIG. 11 shows an example of bandwidth policy store unit 740 in the case of limiting the maximum bandwidth of each class of each output port group. Bandwidth policy store unit 740 includes an entry 741 that sets the maximum bandwidth for each class of the output port group. In bandwidth policy store unit 740 in FIG. 11, 20 Mbps and 80 Mbps are set as the maximum bandwidths for classes 1 and 2, respectively, of output port group 1, 50 Mbps and 100 Mbps are set for classes 1 and 2, respectively, of output port group 2, and 40 Mbps and 120 Mbps are set for classes 1 and 2, respectively, of output port group 3.

FIG. 12 shows an example of output port group table 750. Output port group table 750 stores an entry 751 that lists the number of the output port group to which a corresponding output port belongs. The set values in this table are consistent with those in output port number table 600 of FIG. 8. The processing of packet read unit 150 includes processing upon packet writing and processing upon packet reading that is performed asynchronous to the processing upon packet writing. Details of the processing will now be described.

<Processing Upon Packet Writing>

When control unit 710 in FIG. 13 receives the output port number as well as class 334 and output port group 333 within internal header unit 330, it reads entry 731 of FIFO control table 730 that corresponds to the output port number and the class received, adds '1' to the read information, and writes the resultant information back to the same entry 731.

<Processing Upon Packet Reading>

Hereinafter, details of the processing upon packet reading will be described with reference to a flowchart (FIG. 14) for an output port k (the output port having the output port number 'k'). When control unit 710 of packet read unit 150 receives a packet transmission request signal 25-$k$ ($k$=1 to 4) from packet transmitting/receiving circuit 211, the processing starts (step 1200). Firstly, control unit 710 reads entry 751-$k$ ($k$=1 to 4) of output port group table 750 that corresponds to the output port number 'k', to decide the output port group to which output port number 'k' belongs (step 1201).

Next, control unit 710 reads two entries 731 of FIFO control table 730 that correspond to output port number 'k' (step 1202), and checks the presence/absence of entry 731 storing a positive integer, to thereby decide a class in which at least one packet is stored (step 1203). If the checked result is "present", it reads all the entries 721 of packet transmission control table 720 that correspond to the classes of output port k in which the packet is stored, and decides the class of which the packet transmission time is earliest (i.e., the class having the smallest packet transmission time) as the "transmission class" (step 1204). For example, in the case of output port 1, only the packets of class 1 are stored according to FIG. 10. Thus, class 1 of output port 1 is decided as the "transmission class". In the case of output port 2, packets of classes 1 and 2 are stored. Thus, class 1 of output port 2 having the smaller packet transmission time is decided as the "transmission class". If the checked result is "absent", the process enters standby, in which it is waited until the value of entry 731 corresponding to output port number 'k' changes from '0' to a positive integer by the above-described processing upon packet writing that is carried out asynchronous to the processing upon packet reading (step 1214). After a change of the value to a positive integer, steps 1202 and 1203 are carried out again. In step 1203 following step 1214, control unit 710 decides it is "present" and the process proceeds to step 1204 without fail.

Next, the current time indicated by timer 760 is compared with the subsequent packet transmission time of the transmission class (step 1205). When the subsequent packet transmission time≧the current time (i.e., when the subsequent packet transmission time corresponds to the current time or the past time), output port number 'k' and the transmission class are notified to packet buffer 110 as packet transmission port/class information (step 1206). The FIFOij corresponding to the packet transmission port/class information reads the leading packet (i.e., the packet that arrived earliest among the stored packets) and transmits it to the multiplexer. The multiplexer time-multiplexes the packets to be transmitted to the same output port 202, and transmits them to packet transmitting/receiving circuit 211, and at the same time, transmits packet length 331 in internal header unit 330 as transmission packet length information 12 to packet read unit 150 (step 1207).

If the subsequent packet transmission time<the current time (i.e., if the subsequent packet transmission time is the future time), the process waits until the packet transmission time. There may be a case where a packet is stored in the FIFO corresponding to output port number 'k' and entry 731 changes from '0' to a positive integer during this waiting time, in which case the "transmission class" having the earliest packet transmission time may change as well. For example, assume the case where FIFO control table 730 and packet transmission control table 720 store the values as shown in FIGS. 10 and 9, respectively, and output of the packet from class 1 of output port 1 is awaited. In this case, if a packet of class 2 of output port 1 is input, class 2 having the earlier packet transmission time becomes the transmission class. Consequently, control unit 710 reads entry 731 again (step 1202), checks the presence/absence of entry 731 having a positive integer (step 1203), and decides the transmission class again (step 1204).

When the packet transmission time has passed and step 1206 is finished, control unit 710 reads entry 741 from bandwidth policy store unit 740 that corresponds to the transmission class of the output port group (step 1208), and calculates a packet transmission time that is decided by the read maximum bandwidth and the packet length (byte) received from the multiplexer (step 1209). The packet transmission time is calculated based on the following expression:

Packet transmission time=current time+packet length (byte)×8/maximum bandwidth(bit/second)  Expression 1.

After the calculation, a new packet transmission time is written back to bandwidth policy store unit 740 (step 1210). Lastly, entry 731 of FIFO control table 730 corresponding to the transmission class of output port k is read out (step 1211), '1' is subtracted therefrom (step 1212), and the resultant value is written back to FIFO control table 730 (step 1213). The process then returns to step 1200.

During the standby in step 1205, the packet transmission time of each class may change by the process in step 1210 for another output port m (m≠k) that belongs to the same output port group. For example, assume the case where FIFO control table 730 and packet transmission control table 720 store the values as shown in FIGS. 10 and 9, respectively, and output of the packet of class 2 of output port 3 is awaited. At this time, when a packet of class 2 of output port 4 in the same output port group 3 is output, the packet transmission time of output port group 3 is updated. Thus, control unit 710 reads entry 731 again (step 1202), checks the presence/absence of entry 731 having a positive value (step 1203), and decides the transmission class again (step 1204).

As described above, packet read unit 150 of shaping unit 100 of the present embodiment calculates a packet transmission time for each class of the output port group. The packet of each class is transmitted only when the packet transmission time is at present or in the past. In this manner, shaping unit 100 can implement packet transmission in compliance with the maximum bandwidth set for the class of the output port group. For example, the packets of classes 1 and 2 of output port group 3 are output to output ports 202-3 and 202-4 at the bandwidths of not greater than 40 Mbps and 120 Mbps, respectively.

In the embodiment described above, the case of limiting the maximum bandwidth of each class has been described. Alternatively, shaping unit 100 of the present embodiment may control the bandwidths based on another policy. For example, while the packets are transmitted by securing the minimum bandwidth for each class, they may be transmitted exceeding the minimum bandwidth when the total bandwidth of each output port group includes excess bandwidth. Herein, the total bandwidth refers to a summation of the physical bandwidths of the output ports constituting the output port group. For example, when output port 202 is the Fast Ethernet port having the physical bandwidth of 100 Mbps, in the present embodiment where output port group 3 is formed of output ports 3 and 4, output port group 3 has the total bandwidth of 200 Mbps (=100 Mbps×2 ports). The total bandwidth may have excess bandwidth in the case where the summation of the minimum bandwidths of the respective classes is less than the total bandwidth, or in the case where although the summation of the minimum bandwidths of the respective classes is greater than the total bandwidth, there is no input of a packet of a specific class, and thus, there is no packet output for the minimum bandwidth thereof.

To guarantee the minimum bandwidth, bandwidth policy store unit 740 of shaping unit 100 stores the minimum bandwidth instead of the maximum bandwidth in entry 741. When the set values are as shown in FIG. 11, the minimum bandwidths of classes 1 and 2 of output port group 3 are 40 Mbps and 120 Mbps, respectively. Shaping unit 100 calculates the packet transmission time in step 1208 based on the following expression 2 similar to the expression 1:

Packet transmission time=current time+packet length (byte)×8/minimum bandwidth(bit/second)  Expression 2.

Further, to allocate the excess bandwidth to the respective classes, in step 1205, the process proceeds to step 1206 irrespective of the value of the packet transmission time. With the modification in step 1205, the excess bandwidth is distributed based on a ratio between the minimum bandwidths of the respective classes. For example, assume that the minimum bandwidths are as shown in FIG. 11 and that 150 Mbps packets of respective classes 1 and 2 of output port group 3 are input to packet forwarding apparatus 200 of the present embodiment. When output ports 3 and 4 are the Fast Ethernet ports, the excess bandwidth of 40 Mbps (=200 Mbps−(40 Mbps+120 Mbps)) of output port group 3 is distributed to the respective classes at the ratio between the minimum bandwidths thereof, and thus, the transmission bandwidths of the respective classes become 50 Mbps and 150 Mbps.

As another example, it is also possible to secure the minimum bandwidth while limiting the maximum bandwidth of each class. FIGS. 15 and 16 respectively show a bandwidth policy store unit 2440 and a packet transmission control table 2520 in such a case. Bandwidth policy store unit 2440 includes an entry 2441 for each class, which stores the minimum bandwidth and the maximum bandwidth. Table 2520 includes an entry 2521 for each class, which stores the packet transmission time for the minimum bandwidth and the packet transmission time for the maximum bandwidth.

Figure 14:
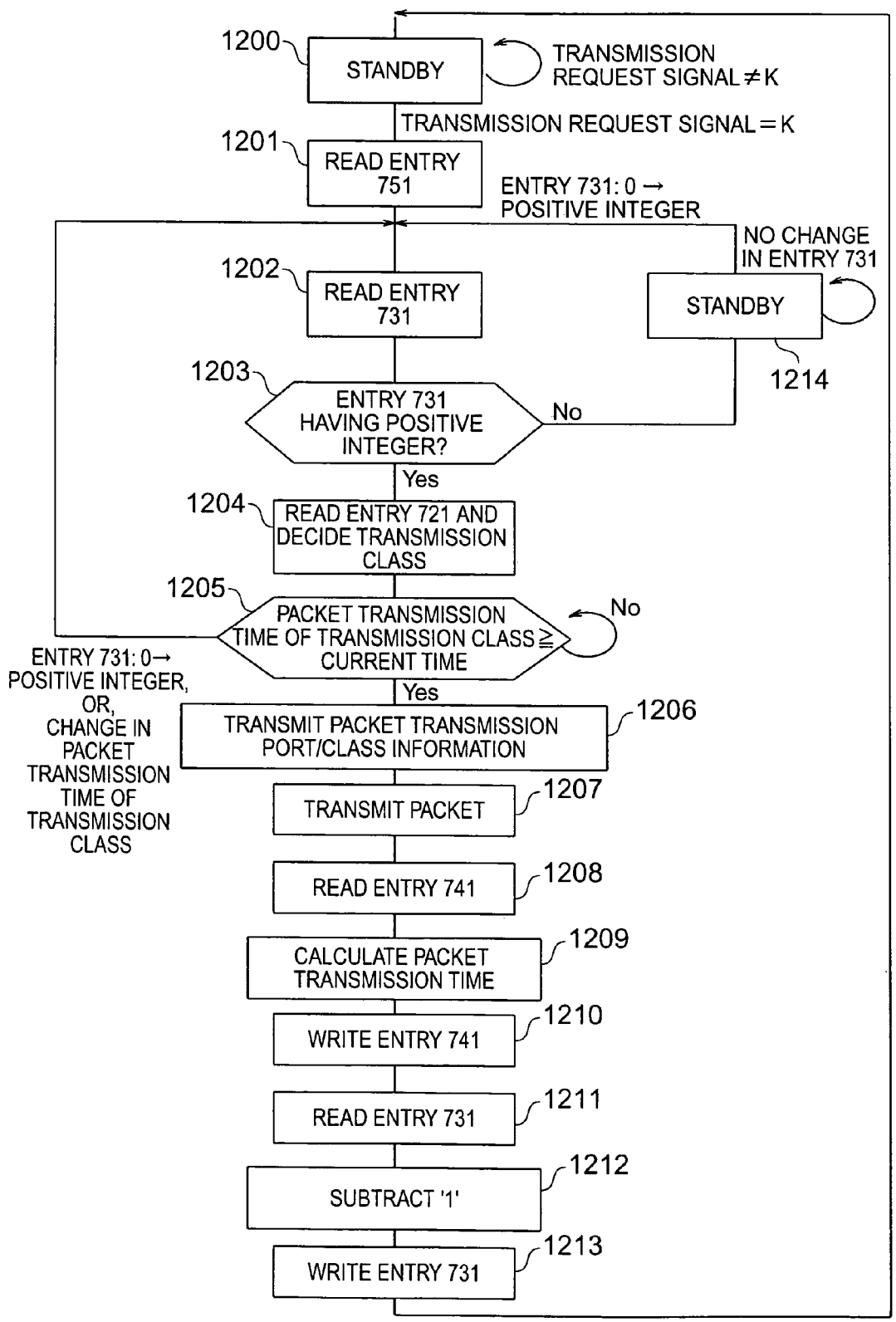
FIG. 14 is a flowchart of processing of packet read unit 150 at the time of packet read.

In steps 1208 and 1209 in FIG. 14, control unit 710 reads entry 2441 of bandwidth policy store unit 2440, and calculates the packet transmission time for the minimum bandwidth and the packet transmission time for the maximum bandwidth based on the expressions 1 and 2, respectively. In step 1204, control unit 710 reads all the entries 2521 in packet transmission control table 2520 that correspond to the classes of output ports k in which packets are stored. Next, it decides the class having the earliest transmission time for the minimum bandwidth and the class having the earliest transmission time for the maximum bandwidth to be the "transmission class for the minimum bandwidth" and the "transmission class for the maximum bandwidth", respectively. In step 1205, it compares the packet transmission times of the transmission classes for the minimum and maximum bandwidths, respectively, with the current time. In step 1206, if the packet transmission time of the transmission class for the minimum bandwidth≧the current time, it notifies packet buffer 110 of the output port number 'k' and the transmission class for the minimum bandwidth as the packet transmission port/class information. On the other hand, when the packet transmission time of the transmission class for the minimum bandwidth<the current time, if the packet transmission time of the transmission class for the maximum bandwidth≧the current time, then it notifies packet buffer 110 of the output port number 'k' and the transmission class for the maximum bandwidth as the packet transmission port/class information. If the packet transmission time of the transmission class for the maximum bandwidth<the current time, the packet transmission time for the maximum bandwidth is awaited.

As yet another example, WFQ (Weighted Fair Queuing) may be adopted to distribute the total bandwidth of output ports 201 of each output port group based on weights W. In this case, an arbitrary bandwidth proportional to W of each class may be set as the value of the minimum bandwidth in bandwidth policy store unit 740. It is noted that the summation of the minimum bandwidths in the same output port group needs to be smaller than the total bandwidth. As already discussed above, the total bandwidth is allocated to the output port group at the ratio of the minimum bandwidths, and therefore, the implementation and operation of this example are identical to those of the shaping unit securing the minimum bandwidth.

As described above, packet read unit 150 of shaping unit 100 in the present embodiment controls the bandwidth of the output packets for each output port group and for each class, and accordingly, it is possible to control the total bandwidth of the packets to be output to a plurality of output ports.

As yet another example, it is also possible to assign priorities to the respective classes, in which case if there is a packet belonging to the class of higher priority, the packet is transmitted, while a packet belonging to the class of lower priority is transmitted when there is no packet belonging to the higher priority. For example, in the present embodiment having classes 1 and 2, assuming that class 1 and class 2 correspond to the class of higher priority and the class of lower priority, respectively, if there is a packet of class 1, the packet of class 1 is transmitted. A packet of class 2 is transmitted only if there is no packet of class 1. In this case, bandwidth policy store unit 740 and packet transmission control table 720 are unnecessary. Further, in step 1204, control unit 710 may decide the class having the highest priority among the classes for which the checked result in step 1203 was "present", to be the transmission class. In step 1205, the process may proceed to step 1206, irrespective of the current time.

(3) Detailed Operations in the Case of Controlling the Transmission Bandwidth for Each Output Label Group Hereinafter, detailed operations of the shaping unit that controls the transmission bandwidth for each output label group, instead of each class as in (2) above, will be described. For the sake of simplification of explanation, the case where the number of output label groups is three will be described, although it is not restricted thereto.

Figure 17:
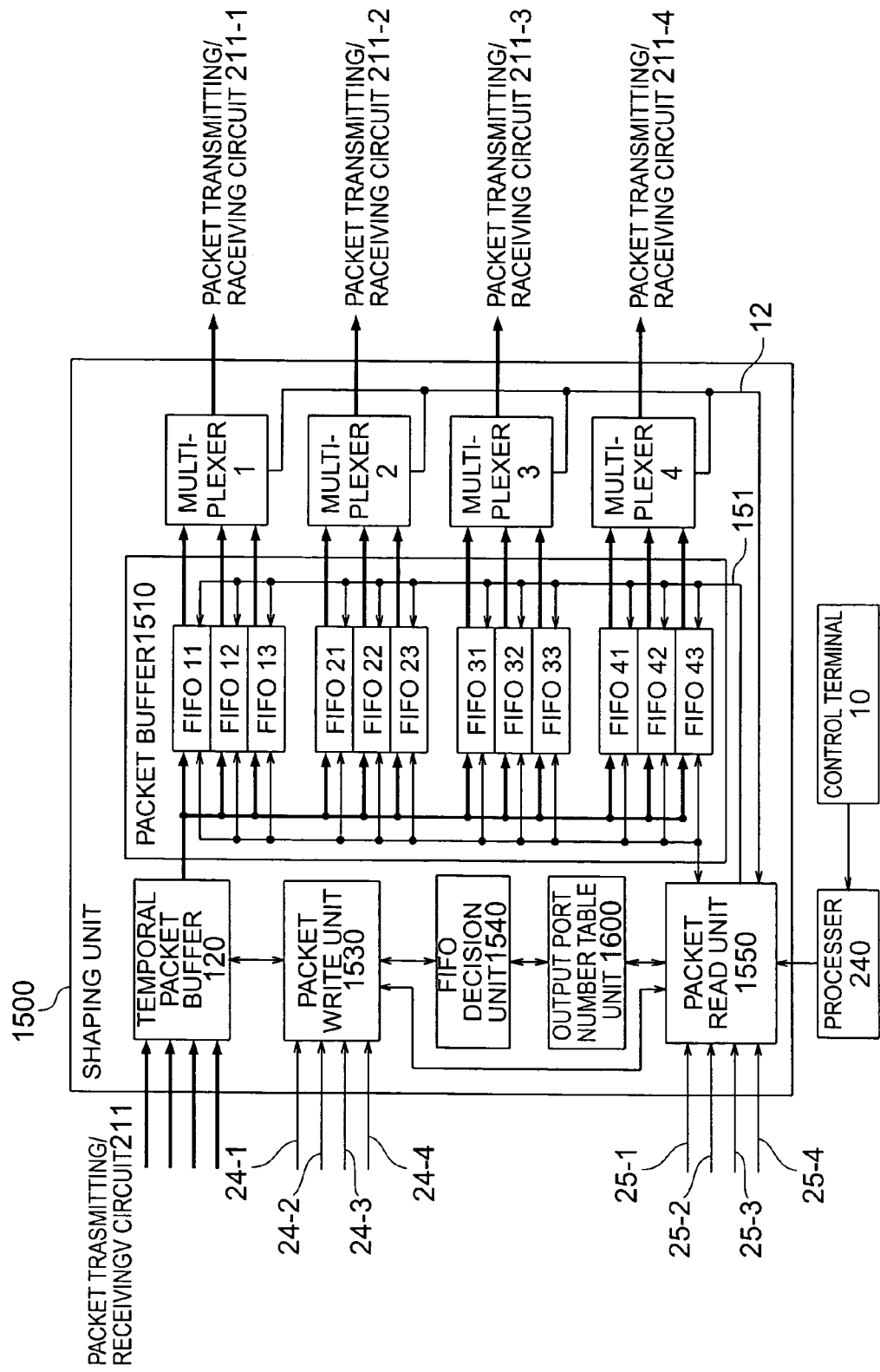
FIG. 17 shows a configuration example of a shaping unit 1500.

FIG. 17 shows a second configuration example of the shaping unit. The shaping unit 1500 includes a plurality of FIFO (queues) for storing packets, for respective output ports and respective output label groups. Otherwise, the configuration of shaping unit 1500 is identical to that of shaping unit 100, except that different reference numerals are allotted to the units.

When shaping unit 1500 receives a packet from packet transmitting/receiving circuit 211, temporal packet buffer 120 stores the packet. A packet write unit 1530 reads information in header unit 310 and internal header unit 330 of the packet stored in temporal packet buffer 120, and transmits the information to a FIFO decision unit 1540. FIFO decision unit 1540 decides one or two candidates of output port numbers and output labels corresponding to output label group 335 in internal header unit 330 (see FIGS. 3 and 6), and selects and transmits one output port number and output label from among the candidates to packet write unit 1530.

To decide the candidates of the output port numbers and output labels, instead of output port number table 600, an output port number table 1600 shown in FIG. 18 is used, which includes an entry 1610-$i$ ($i$=1 to 4) listing two output port numbers and output labels for each output label group. The table 1600 in FIG. 18 indicates the case where the output port numbers corresponding to output label group 1 are 1 and 2 and the corresponding labels are 5 and 6, the output port numbers corresponding to output label group 2 are 2 and 3 and the corresponding labels are 7 and 8, and the output port numbers corresponding to output label group 3 are 3 and 4 and the corresponding labels are 9 and 10.

FIFO decision unit 1540 may read output port number table 1600 using output label group 335 as an address, and decide the read information as the candidates of output port numbers and output labels. To decide one output port number from among the candidates of the output port numbers and output labels, the above-described Hash functions H2($x$) and H1($x$) alone, for example, may be employed.

Upon receipt of the selected output port number and output label, packet write unit 1530 notifies temporal packet buffer 120 of writing of the output label to label 318 and transmission of the stored packet to a packet buffer 1510. Further, it transmits the ultimate output port number and output label group 335 to packet buffer 1510 and a packet read unit 1550. Temporal packet buffer 120 that received the notification writes the output label to label 318 and transmits the packet to packet buffer 1510. FIFOij (i is the ultimate output port number, and j corresponds to the output label group) corresponding to the output port number and output label group 335 stores the received packet.

Packet read unit 1550 controls packet reading from FIFOij for each output label group. It decides the output port through which the packet is to be transmitted and the output label group, and transmits the information to packet buffer 1510, which in turn transmits the packet from the corresponding FIFOij. With the provision of packet read unit 1550 of the present embodiment controlling packet reading for each output label group 335, it is possible to control the output of the packets belonging to a plurality of LSP constituting the output label group.

Figure 19:
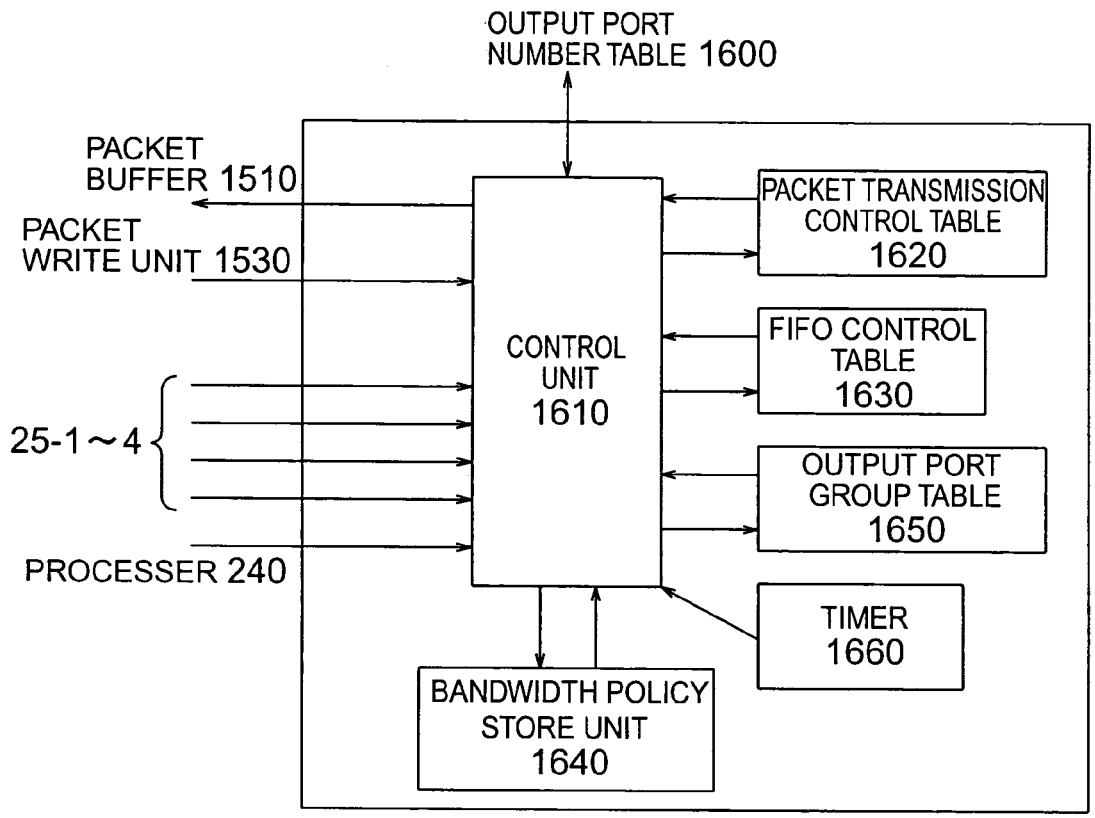
FIG. 19 shows a configuration example of a packet read unit 1550.
Figure 20:
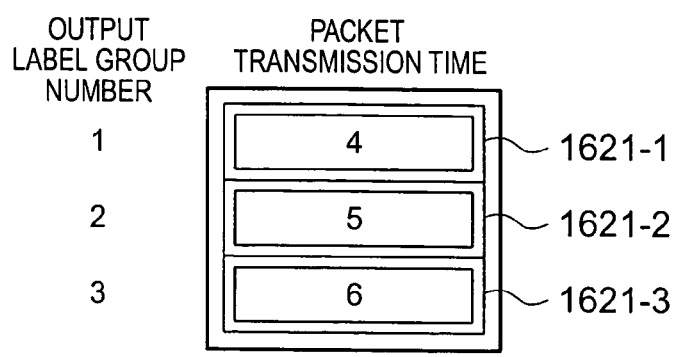
FIG. 20 shows a configuration example of a packet transmission control table 1620.
Figure 24:
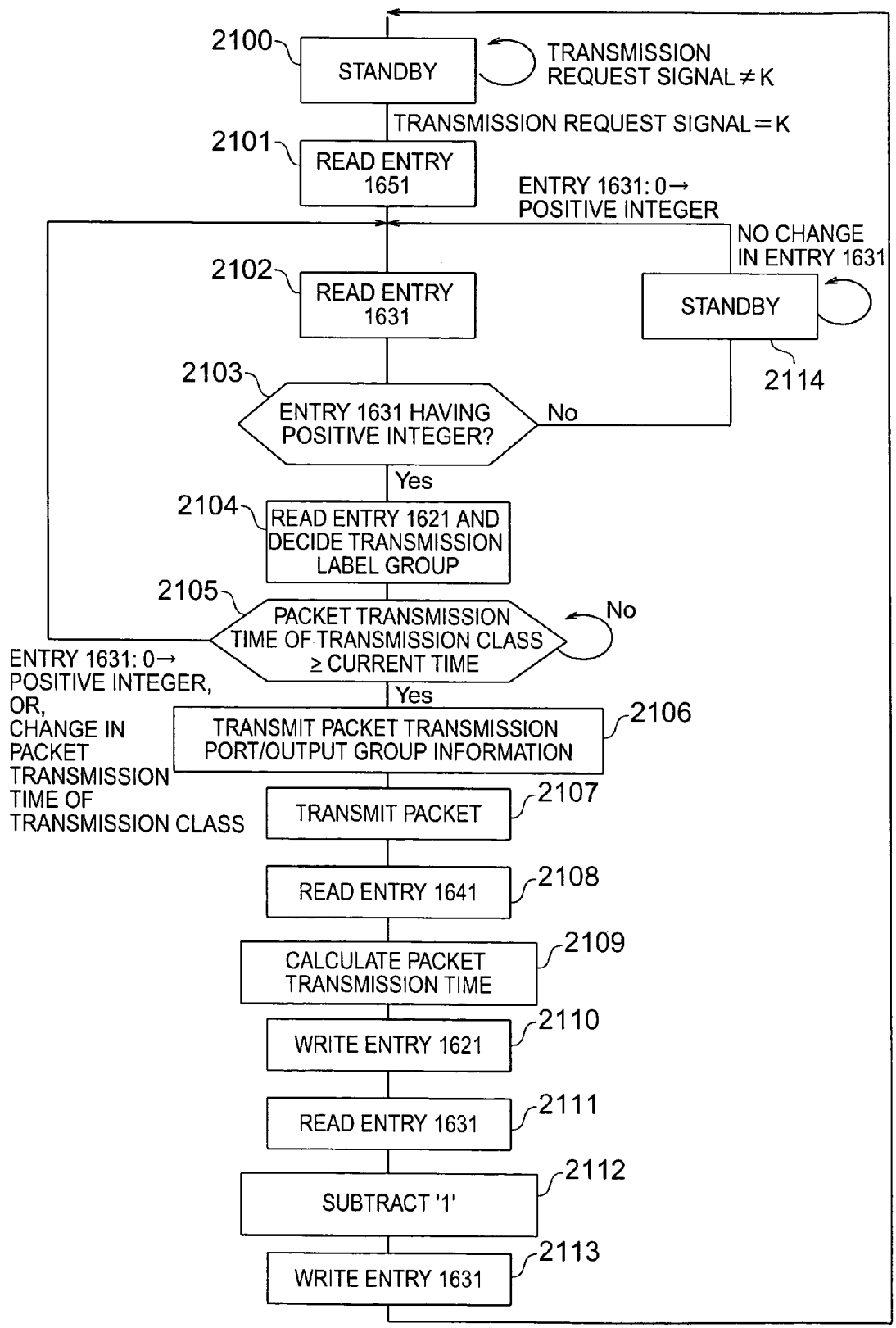
FIG. 24 is a flowchart of processing of packet read unit 1550 at the time of packet read.

FIG. 19 shows an implementation example of packet read unit 1550. FIGS. 20 and 21 show implementation examples of a packet transmission control table 1620 and a FIFO control table 1630, respectively. Packet transmission control table 1620 in FIG. 20 stores a packet transmission time for each output label group. FIFO control table 1630 in FIG. 21 stores the number of stored packets in FIFOij for each output port number and for each output label group.

FIG. 22 shows an example of a bandwidth policy store unit 1640 in the case of controlling the maximum bandwidth of the output label group. Bandwidth policy store unit 1640 is formed of an entry 1641 that sets the maximum bandwidth for each output label group.

FIG. 23 shows an example of an output label group table 1650. Output label group table 1650 stores an entry 1651 that lists three output label group numbers to which the LSP set for each output port belongs. Although entry 1651 can support the case where the number of output label groups set for each output port is three or less, entry 1651 may be configured to list four or more output label group numbers to support the case where the number of output label groups is four or more.

The table includes the set values that are consistent with the set values in output port number table 1600 shown in FIG. 18.

Hereinafter, details of the processing upon packet writing and the processing upon packet reading performed by packet read unit 1550 will be described.

<Processing Upon Packet Writing>

When a control unit 1610 in FIG. 19 receives the output port number and output port group 333 in internal header unit 330, it reads entry 1631 from FIFO control table 1630 that corresponds to the received output port number and output label group, adds '1' to the read information, and writes the resultant information back to the same entry 1631.

<Processing Upon Packet Reading>

Hereinafter, details of the processing upon packet reading will be described with reference to a flowchart (FIG. 24) for the output port k.

When control unit 1610 of packet read unit 1550 receives a packet transmission request signal 25-k (k=1 to 4) from packet transmitting/receiving circuit 211, the processing starts (step 2100). Firstly, control unit 1610 reads an entry 1651-k (k=1 to 4) of output label group table 1650 that corresponds to the output port number 'k', and decides the output label group(s) set for output port k (step 2101). For example, if k is '2', output label groups 1 and 2 are decided to be the output label groups set for output port 2.

Next, control unit 1610 reads all the entries 1631 of FIFO control table 1630 that correspond to the output port number 'k' and the output label group(s) decided in step 2101 (step 2102), and checks the presence/absence of entry 1631 storing a positive integer (step 2103). When the checked result is "present", it reads all the entries 1621 that correspond to the output label group corresponding to entry 1631 storing the positive integer, and decides the output label group having the earliest packet transmission time as the "transmission label group" (step 2104). When the checked result is "absent", it waits until the value of entry 1631 corresponding to output port number 'k' changes from '0' to a positive integer by the above-described processing upon packet writing that is carried out asynchronous to the processing upon packet reading (step 2114). Upon change of the value to a positive integer, steps 2102 and 2103 are repeated.

Next, control unit 1610 compares the current time indicated by timer 1660 with the packet transmission time of the transmission class (step 2105). When the packet transmission time≧the current time, it notifies packet buffer 1510 of the output port number 'k' and the output label group as packet transmission port/output group information 151 (step 2106). FIFOij in packet buffer 1510 corresponding to the packet transmitting port/output group information 151 reads and transmits the leading packet in the queue to the multiplexer, which time-multiplexes the packets to be transmitted to the same output port 202 and transmits them to packet transmitting/receiving circuit 211. At the same time, it transmits packet length 331 in internal header unit 330 to packet read unit 1550 as transmission packet length information 12 (step 2107). On the other hand, if the packet transmission time<the current time, it waits till the packet transmission time (step 2105). During this waiting time, if the FIFO corresponding to the output port number 'k' stores packet(s) and entry 1631 changes from 0 to a positive integer, control unit 1610 reads entry 1631 again (step 2102), checks the presence/absence of entry 1631 storing a positive integer (step 2103), and decides the "transmission label group" (step 2104).

When the packet transmission time has passed and step 2106 is finished, control unit 1610 reads entry 1641 of bandwidth policy store unit 1640 that corresponds to output label group 335 (step 2108). Further, it calculates the packet transmission time decided from the read maximum bandwidth and the packet length (byte) received from the multiplexer, based on the above-described expression 1 (step 2109), and writes a new packet transmission time back to packet transmission control table 1620 (step 2110). Lastly, it reads entry 1631 of FIFO control table 1630 that corresponds to the transmission class of the output port k (step 2111), subtracts '1' (step 2112), and writes it back to FIFO control table 1630 (step 2113). The process then returns to step 2100.

Further, the packet transmission time of each output label group may change during the waiting time in step 2105 when the process of step 2110 is carried out for another output port to which the LSP belonging to the same output label group is set. In such a case, control unit 1610 reads entries 1631 again (step 2102), checks the presence/absence of entry 1631 storing a positive integer (step 2103), and decides the "transmission label group" (step 2104).

As described above, packet read unit 1550 of shaping unit 1500 in the present embodiment calculates the packet transmission time for each output label group. Since the packet of each output label group is transmitted only when the packet transmission time is current or past, shaping unit 1500 can realize packet transmission conformant to the maximum bandwidth set for the output label group.

In (2) and (3) above, the case of calculating and utilizing the transmission time based on the maximum or minimum bandwidth has been explained. Alternatively, the transmission interval or the number of packets may be stored in the bandwidth policy store unit, and the shaping unit may use such information to control the output packets.

(4) Setting of Bandwidth Policy

Lastly, setting of bandwidth policy store unit 740, 1640 and 2440 in the packet read unit will be described. The administrator of packet forwarding apparatus 200 performs setting of the bandwidth policy store unit from external control terminal 10. FIG. 25 shows, by way of example, commands input to control terminal 10 at the time of setting of bandwidth policy store unit 740, 1640. These commands: shaper are the commands for setting the values of the maximum bandwidths listed in 2203 to the classes listed in 2202 of Link Aggregation Group listed in 2201. When these commands are input, control terminal 10 transmits the whole information to processor 240.

Processor 240 that received the commands transmits the information of 2201, 2202, 2203 and an instruction to write the information to control unit 710 (or 1610) of packet read unit 150 (or 1550). Upon receipt of the information, control unit 710 (or 1610) writes the value of 2203 to entry 741 (or 1641) corresponding to 2101 and 2202. When setting the value of the minimum bandwidth, "peak_rate" in the command may be changed to "minimum_rate". Further, when setting the maximum bandwidth and the minimum bandwidth of bandwidth policy store unit 2440, "peak_rate X Mbps" may be changed to "peak_rate X Mbps, minimum_rate Y Mbps". Here X and Y represent bandwidths set as the maximum and minimum bandwidths, respectively.

Second Embodiment

Router Having Bandwidth Monitoring Function (1) General Operation of Router

Firstly, a general operation of a packet forwarding apparatus 2600 having a bandwidth monitoring function of the present embodiment will be described. The bandwidth monitoring function of the present embodiment controls the bandwidth of the packets input via output ports constituting an input port group, and the bandwidth of the packets output to output ports constituting an output port group. Here, the input port group refers to a set of a plurality of input ports constituting the Link Aggregation, or a plurality of input ports to which protected LSP and backup LSP of the MPLS are set. The output port group refers to a set of a plurality of output ports constituting the Link Aggregation, or a plurality of output ports to which protected LSP and backup LSP of the MPLS are set.

Further, the bandwidth monitoring function of the present embodiment controls the bandwidth of the packets belonging to an input label group, and controls the bandwidth of the packets belonging to an output label group. Here, the input label group refers to a set of protected LSP and backup LSP set for a plurality of input ports constituting an input port group, and the output label group refers to a set of protected LSP and backup LSP set for a plurality of output ports constituting an output port group.

Figure 26:
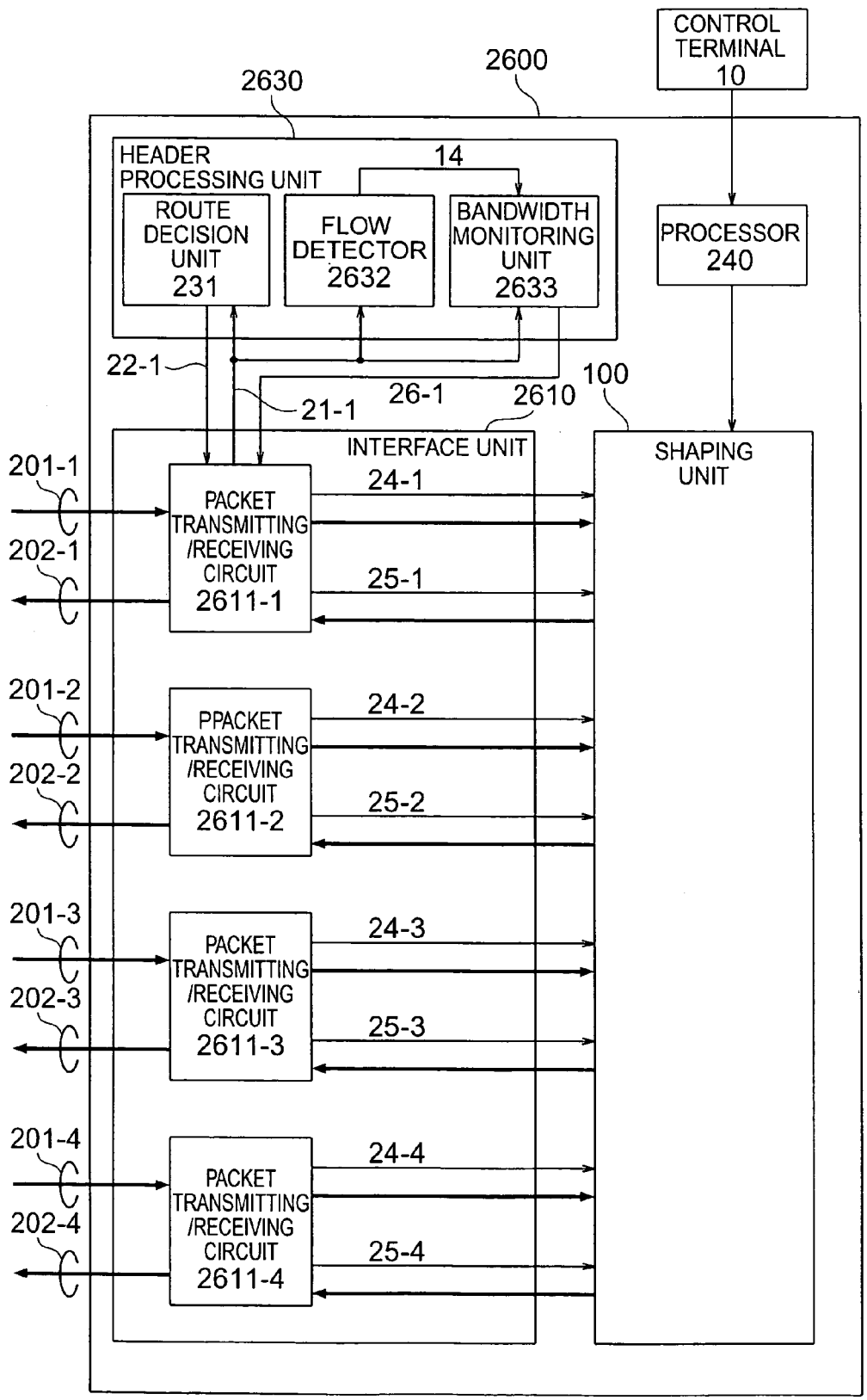
FIG. 26 shows a configuration example of a packet forwarding apparatus 2600.

FIG. 26 shows a configuration example of packet forwarding apparatus 2600 of the present embodiment. In FIG. 26, the components identical to those of packet forwarding apparatus 200 in FIG. 1 have the same reference numbers allotted. Packet forwarding apparatus 2600 is formed of N input ports 201-$i$ (i=1 to N) via which packets are input, N output ports 202-$i$ (i=1 to N), an interface unit 2610, a shaping unit 100, a header processing unit 2630 specific to the present embodiment, and a processor 240. Interface unit 2610 includes N packet transmitting/receiving circuits 2611-$i$ (i=1 to N) that perform transmitting/receiving processing of packets for the respective input ports 201-$i$. Header processing unit 2630 includes a route decision unit 231, a flow detector 2632 that decides a flow to which the packet belongs based on header information or the like, and decides the number of a flow bundle (referred to as "flow bundle number") that is a set of a plurality of flows to which the flow belongs, and a bandwidth monitoring unit 2633 that calculates a bandwidth of each flow bundle, and decides packet pass/drop and a DSCP value indicating packet transmission priority according to the relevant bandwidth and the bandwidth allocated in advance to the flow bundle. Although FIG. 26 shows packet transmitting/receiving circuit 2611-1 alone is connected to header processing unit 2630, as in the case of the first embodiment, every packet transmitting/receiving circuit 2611-$i$ is connected to header processing unit 2630.

Further, the format of a packet input from input port 201-$i$, the format of the packet in packet forwarding apparatus 2600, the format of a MPLS packet, and the format of the MPLS packet in packet forwarding apparatus 2600 are identical to those of the first embodiment.

Hereinafter, a flow from the time when a packet is input via input port 201 to the time when it is output via output port 202 will be described. When a packet is input via input port 201, internal header adding circuit 510 of packet transmitting/receiving circuit 2611 shown in FIG. 27 adds internal header unit 330 to the packet. Further, it counts the byte length of the packet and writes it to packet length 331, and also writes the number of input port 201 via which the packet was input to input port number 332. It then stores the resultant packet in temporal packet buffer 520. Further, internal header adding circuit 510 decides the input port group number indicating the number of the input port group corresponding to input port 201, and transmits it to temporal packet buffer 520. The buffer 520 stores the information together with the packet. The decision is made by referring to an input port group table having the same format as output port group table 750 shown in FIG. 12. The input port group table stores an entry listing an input port group number to which each input port belongs. Internal header adding circuit 510 decides the input port group number by referring to the entry corresponding to input port 201 of the packet.

Next, packet header transmission unit 550 transmits header unit 310 and internal header unit 330 of the packet within temporal packet buffer 520 and the input port group number as packet header information 21 to route decision unit 231, flow detector 2632 and bandwidth monitoring unit 2633 of header processing unit 2630. At this time, output port number 336, output port group 333, class 334, and output label group 335 include meaningless values.

Route decision unit 231 that received packet header information 21 decides the output port group number from the DIP or DMAC in the information 21, as in the case of the first embodiment, and transmits it as packet output port information 22 to packet transmitting/receiving circuit 2611.

Flow detector 2632 of header processing unit 2630 decides the flow to which the received packet belongs from the received packet header information 21, and decides the number of the flow bundle (referred to as "flow bundle number") that is a set of a plurality of flows corresponding to the flow. It then notifies bandwidth monitoring unit 2633 of the relevant flow bundle number. Bandwidth monitoring unit 2633 calculates the bandwidth of the packets belonging to the relevant flow bundle, and decides whether it exceeds a preset bandwidth or not. Further, it decides DSCP indicating priority within the network based on a result of the decision, and transmits DSCP information 26 to packet transmitting/receiving circuit 2611. While flow detector 232 of the first embodiment decides classes to be used in shaping unit 100, flow detector 2632 does not decide them, since shaping unit 100 in the second embodiment does not require information about the class.

When flow detector 2632 assigns the same flow bundle number to the packets input via a plurality of input ports constituting an input port group, it is possible to collectively measure the bandwidth of the packets input via the input ports of the input port group, which enables control of the bandwidth. Further, when flow detector 2632 assigns the same flow bundle number to the packet input via an input port A and having header information and input port number satisfying a specific condition A and the packet input via another input port B constituting the same input port group as input port A and having header information and input port number satisfying a specific condition B, it is possible to collectively control the bandwidth of the packet corresponding to input port A and satisfying condition A and the packet corresponding to input port B and satisfying condition B. For example, if the label value of protected LSP set to input port A is used as the condition A and the label value of backup LSP set to input port B is used as the condition B, the bandwidth of the packets belonging to the input label group (here, a set of protected LSP and backup LSP) can be controlled.

Upon receipt of packet output port information 22 and DSCP information 26, header writing circuit 560 of packet transmitting/receiving circuit 2611 writes the received information to the respective fields of output port group 333 and DSCP 315 of the packet within temporal packet buffer 520. Further, packet read circuit 530 of FIG. 27 reads the packet from temporal packet buffer 520 and transmits it to shaping unit 100 together with packet transmission signal 24. At this time, class 334 and output port number 336 of the packet include meaningless information.

Meanwhile, route decision unit 231 in packet forwarding apparatus 2600 of the MPLS network decides the output label group number based on input port number 332 and label 318 of the received packet header information 21, as in the case of the first embodiment. Further, it transmits the information to packet transmitting/receiving circuit 2611 as packet output port information 22. Header write circuit 560 of packet transmitting/receiving circuit 2611 writes the output label group number in packet output port information 22 and DSCP in DSCP information 26 to output label group 335 and DSCP 315, respectively.

Hereinafter, the difference in operation of shaping unit 100 of the present embodiment from that of the first embodiment will be described. In the second embodiment, shaping unit 100 does not control the bandwidth. It stores a packet in one of a plurality of FIFO provided corresponding to output ports, and transmits the packet from the FIFO to packet transmitting/receiving circuit 2611 at a physical bandwidth of the corresponding output port 202. Thus, unlike the case of the first embodiment, packet write unit 130 stores all the packets in a FIFO corresponding to class 1 of the output port decided by FIFO decision unit 140. Further, in bandwidth policy store unit 740 in packet read unit 150, entry 741 corresponding to the relevant FIFO lists a value greater than the physical bandwidth of the relevant output port. Thus, upon receipt of packet transmission request signal 25 from packet transmitting/receiving circuit 2611, packet read unit 150 immediately reads a packet out of the FIFO, and transmits it to packet transmitting/receiving circuit 2611. Furthermore, in the present embodiment, the packet transmitted from shaping unit 100 is subjected to bandwidth control again, based on the output port number. As such, packet write unit 130 overwrites output port number 336 of the packet within temporal packet buffer 120 by the output port number decided by FIFO decision unit 140. The operation of shaping unit 100 other than described above is identical to that of the first embodiment.

When packet transmitting/receiving circuit 2611 receives a packet transmitted from shaping unit 100, it stores the packet in temporal packet buffer 570. Packet header transmission unit 550 transmits the information of header unit 310 and internal header unit 330 of the packet as packet header information 21 to flow detector 2632 and bandwidth monitoring unit 2633 of header processing unit 2630. Flow detector 2632 of header processing unit 2630 decides the flow bundle number based on packet header information 21 again, and notifies it to bandwidth monitoring unit 2633.

Bandwidth monitoring unit 2633 calculates the bandwidth of the packets belonging to the flow bundle, in a similar manner as described above, and decides whether it exceeds a preset bandwidth or not. Further, it decides DSCP that is a priority within the network based on the decided result, and transmits it as DSCP information 26 to packet transmitting/receiving circuit 2611. At this time, when flow detector 2632 assigns the same flow bundle number to the packets forwarded to a plurality of output ports constituting an output port group, it is possible to collectively calculate the bandwidth of the packets to the output ports of the output port group, to thereby control the bandwidth. Further, when flow detector 2632 assigns the same flow bundle number to the packet to be output to an output port C and having the header information and the output port number satisfying a specific condition C and the packet to be output to another output port D constituting the same output port group as output port c and having the header information and the output port number satisfying a specific condition D, the bandwidth of the packet for output port C and satisfying condition C and the packet for output port D and satisfying condition D can be controlled. For example, if a value of the label of protected LSP set to output port C and a value of the label of backup LSP set to output port D are used as conditions C and D, respectively, then the bandwidth of the packets belonging to the output label group (here, a set of protected LSP and backup LSP) can be controlled as a whole. It is noted that the same applies to the case where the number of LSP forming an output label group is three or more.

Lastly, packet transmitting/receiving circuit 2611 deletes internal header unit 330 from the received packet, and transmits the resultant packet to output port 202.

(2) Detailed Operations of Flow Detector

Hereinafter, detailed operations of flow detector 2632 of the present embodiment will be described with reference to FIGS. 28-33. Firstly, an operation at the time (referred to as "packet receiving time") when packet transmitting/receiving circuit 2611 receives a packet via input port 201 and receives packet header information 21 corresponding to the packet will be described. An operation at the time (referred to as "packet transmitting time") when packet transmitting/receiving circuit 2611 receives a packet from shaping unit 100 and also receives packet header information 21 corresponding to the packet will be described later.

Figure 28:
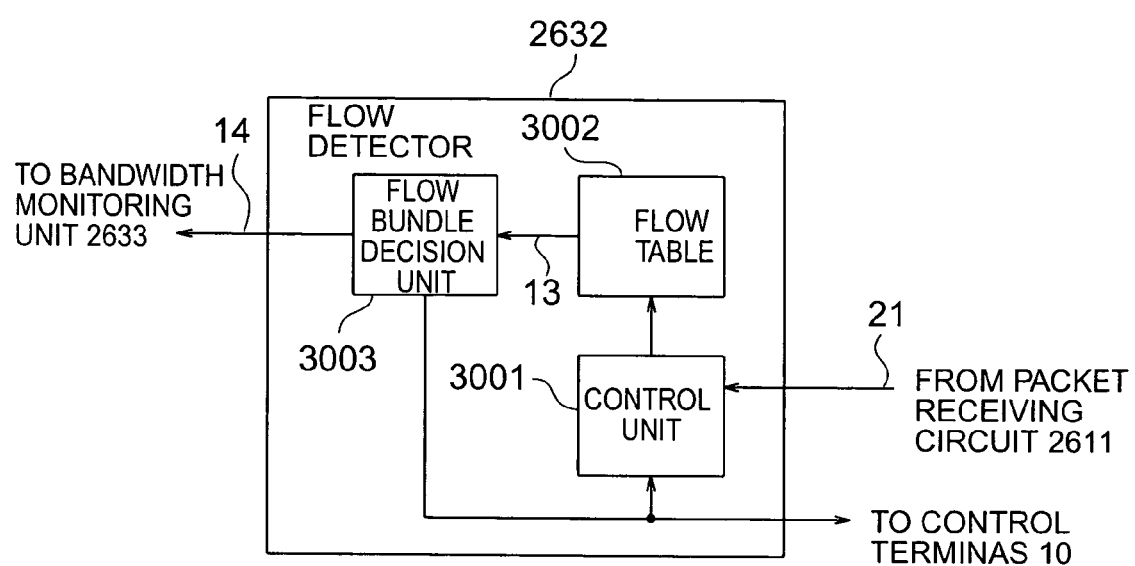
FIG. 28 shows a configuration example of a flow detector 2632.
Figure 29:
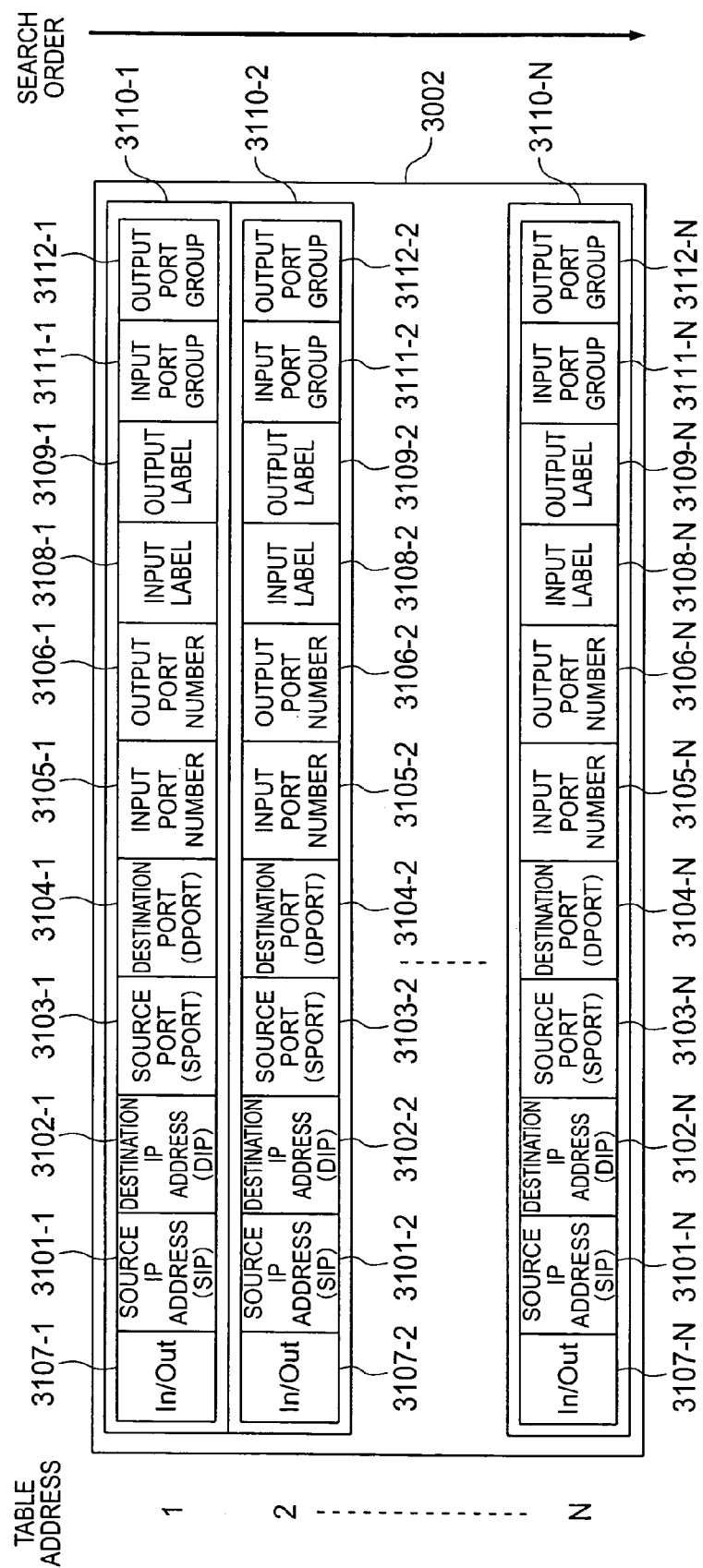
FIG. 29 shows a configuration example of a flow table 3002.

FIG. 28 is a block diagram of flow detector 2632, and FIG. 29 shows a format of a flow table 3002 included in flow detector 2632. Flow table 3002 has a plurality of flow entries 3110-$i$ ($i$=1 to N), which each include as the conditions for identifying the flow, SIP 3101-$i$, DIP 3102-$i$, SPORT 3103-$i$, DPORT 3104-$i$, input port number 3105-$i$, output port number 3106-$i$, input label 3108-$i$, output label 3109-$i$, input port group 3111-$i$, output port group 3112-$i$, and In/Out 3107-$i$. In/Out 3107 describes at which time, the packet receiving time or the packet transmitting time, the flow entry 3110 is valid. Specifically, when In/Out 3107 is '1', it shows that the relevant entry 3110 is valid at the packet receiving time and invalid at the packet transmitting time. When it is '0', it shows that the entry 3110 is valid at the packet transmitting time and invalid at the packet receiving time. The administrator of packet forwarding apparatus 2600 sets flow entries 3110-$i$ via control terminal 10. When control terminal 10 transmits to packet forwarding apparatus 2600 a write instruction to flow table 3002, an address of flow table 3002, and write information (information corresponding to SIP 3101, DIP 3102, SPORT 3103, DPORT 3104, input port number 3105, output port number 3106, input label 3108, output label 3109, input port group 3111, output port group 3112, and In/Out 3107) to be written into flow table 3002, a control unit 3001 writes the write information to the above-described address of flow table 3002. At the packet receiving time, packet header information 21 includes no information corresponding to the output port number, output label and output port group. Thus, a mask value (shown by "*") is set for each of output port number 3106, output label 3109 and output port group 3112 in entry 3110, indicating that it is not used as the condition for flow entry identification.

Figure 30:
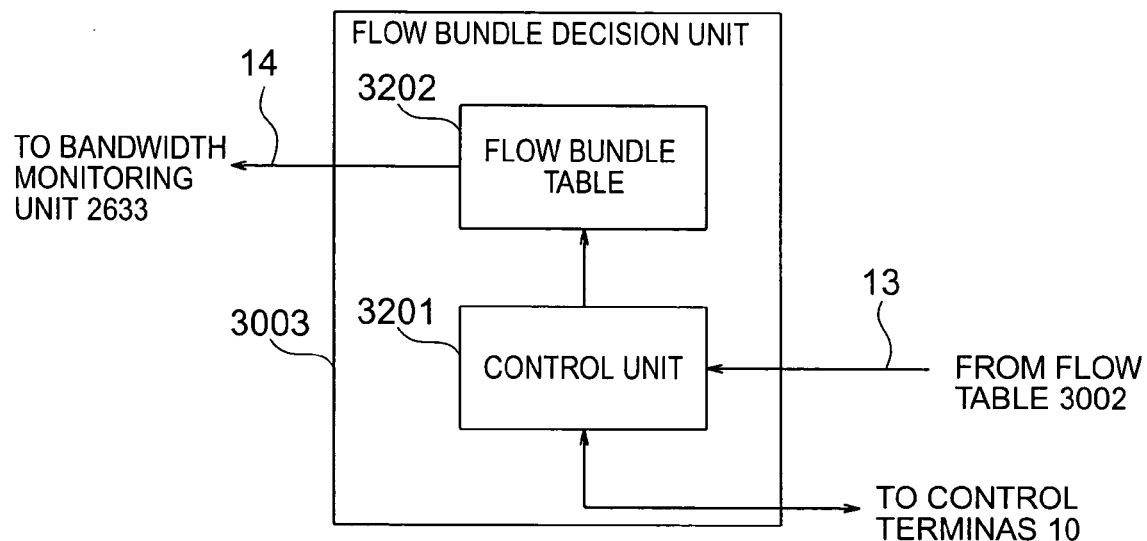
FIG. 30 shows a configuration example of a flow bundle decision unit 3003.
Figure 31:
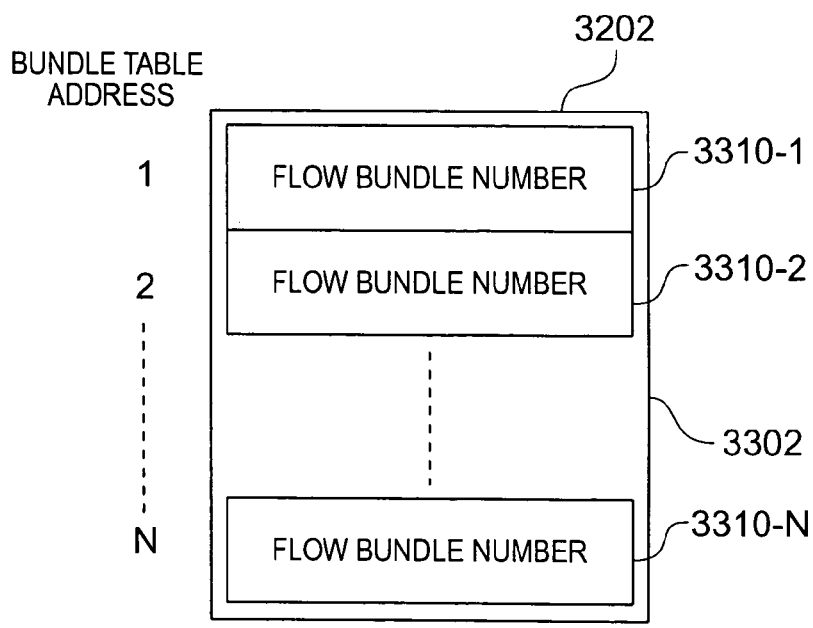
FIG. 31 shows a configuration example of a flow bundle table 3202.

When control unit 3001 of flow detector 2632 receives packet header information 21, it reads flow entry 3110-1 having the table address of '1', and when the information within In/Out 3107 is '1', it compares SIP 3101, DIP 3102, SPORT 3103, DPORT 3104, input port number 3105, input label 3108, and input port group 3111 with SIP 311, DIP 312, SPORT 313, DPORT 314, input port number 332, label 318, and the input port group in packet header information 21 (comparison is not carried out for output port number 3106, output label 3109 and output port group 3112 to each of which the mask value "*" is set). When they match, the table address of '1' is transmitted as matched address information 13 to a flow bundle decision unit 3003. When they mismatch, the table address is incremented by 1, and reading of entry 3110 and comparison described above are repeated, and the address of the flow entry 3110 that matched first is transmitted as matched address information 13 to flow bundle decision unit 3003. One piece of matched address information 13 corresponds to one flow. Flow bundle decision unit 3003 assigns a flow bundle number as an identifier of the flow bundle for each matched address information 13 (i.e., for each flow), and transmits it as a flow bundle number 14 to bandwidth monitoring unit 2633. When flow bundle decision unit 3003 assigns the same flow bundle number to the packets input from input ports of the same input port group, the packets input via the input ports can be treated as one flow bundle. FIG. 30 shows an example of flow bundle decision unit 3003. When a control unit 3201 receives matched address information 13, it transmits the value as it is as a read address of a flow bundle table 3202. FIG. 31 shows a format of flow bundle table 3202. Flow bundle table 3202 outputs the flow bundle number 3310-*j* (j=1 to N) that corresponds to the read address as flow bundle number 14.

Assume that the packets input via the same input port group are treated as one flow bundle. In this case, the number of each input port constituting the input port group may be set to input port number 3105 of flow entry 3110-*i* of flow table 3002 and mask "*" may be set to any of the remaining conditions, and further, flow bundle numbers 3310 corresponding to the respective entries 3110 may be set to the same value. This means that when the input port group is formed of n input ports, n flow entries 3110 and n flow bundle numbers 3310 need to be set. In order to reduce the number of flow entries 3110 and flow bundle numbers 3310 to be set, the number of group to be detected may be set to input port group 3111 of entry 3110 and mask "*" may be set to the remaining conditions, in which case one flow entry 3110 and flow bundle number 3310 will be set.

It is also possible to treat the packet input via an input port A and having header information and input port number satisfying a specific condition A and the packet input via another input port B constituting the same input port group as input port A and having header information and input port number satisfying a specific condition B as one flow bundle. For example, if the value of the label of protected LSP set to input port A and the value of the label of backup LSP set to input port B are used as conditions A and B, respectively, the bandwidth of the packets belonging to the input label group (here, a set of protected LSP and backup LSP) can be controlled collectively. In this case, input port A and the label of the protected LSP are set to input port number 3105 and input label 3108, respectively, of flow entry 3110 in flow table 3002, and input port B and the label of the backup LSP are set to input port number 3105 and input label 3108, respectively, of another flow entry 3110. These flow entries 3110 have the remaining fields filled with mask "*". Further, flow bundle numbers 3310 corresponding to the respective entries 3110 are set to the same value. In this case, it is necessary to set two flow entries 3110 and two flow bundle numbers 3310. Meanwhile, if it is not known from which input port, A or B, the packets satisfying the desired conditions A, B are to be input, or if they are to be input via both of input ports A and B, further setting will be required. For example, assume that packets having protected label or backup label are input via both of input ports A and B. In this case, four flow entries 3110 listing input port A and the label value of protected LSP, input port A and the label value of backup LSP, input port B and the label value of protected LSP, and input port B and the label value of backup LSP, respectively, as the flow detecting conditions, as well as four flow bundle numbers 3310 corresponding respectively thereto will have to be set. In order to reduce the number of flow entries 3110 and flow bundle numbers 3310 to be set, an entry 3110 listing the input port group number to be detected and the label value of protected LSP in input port group 3111 and input label 3108, respectively, as the flow detecting conditions, and another entry 3110 listing the relevant group number and the label value of backup LSP may be set, and flow bundle numbers 3310 corresponding to the relevant entries 3110 may be set. In this case, by designating the input port group number as the condition of flow entry 3110, the number of flow entries 3110 and flow bundle numbers 3310 to be set is reduced from four to two. In this manner, packet forwarding apparatus 2600 of the present invention provided with input port group 3111 in flow entry 3110 enables reduction of the number of flow entries 3110 required to be set.

The administrator of packet forwarding apparatus 2600 sets entry 3110 in flow table 3002 and flow bundle number 3310 in flow bundle table 3202 via control terminal 10. Command examples for aggregating input ports 2, 3 and 4 constituting a certain input port group into one flow bundle: flow_group 1 are shown in the upper three rows in FIG. 32. The command: flow in FIG. 32 is a command having the respective fields of 3502, 3503, 3504, 3505, 3506, 3507, 3510, 3511, 3512, 3513, and 3509 set to SIP 3101, DIP 3102, SPORT 3103, DPORT 3104, input port number 3105, output port number 3106, input label 3108, output label 3109, input port group 3111, output port group 3112, and In/Out 3107 of flow entry 3110, and having the value of 3508 set to flow bundle number 3310 corresponding to the relevant entry 3110. The three commands flow j (j=1 to 3) in the upper three rows of FIG. 32 are for setting "*" to SIP 3101-*j*, DIP 3102-*j*, SPORT 3103-*j*, DPORT 3104-*j*, output port number 3106-*j*, input label 3108-*j*, output label 3109-*j*, input port group 3111 and output port group 3112 of flow entry 3110-*j* (j=1 to 3), for setting 2, 3 and 4 to input port numbers 3105-1, -2 and -3, respectively, for setting '1' indicating "in" to In/Out 3107, and for setting '1' to flow bundle number 3310-*j* (j=1 to 3) of flow bundle table 3202.

When these commands (flow j (=1 to 3)) are input to control terminal 10, control terminal 10 transmits to packet forwarding apparatus 2600 a write instruction to flow table 3002, the address (j when the command of FIG. 32 is input) of the table, and the write information (with the input port numbers 2, 3 and 4, In/Out of 1 and "*" for the remaining fields when the command of FIG. 32 is input) corresponding to the address. When flow detector 2632 receives the information, control unit 3001 writes the write information corresponding to the address to flow table 3002. Similarly, control terminal 10 transmits to packet forwarding apparatus 2600 a write instruction to flow bundle table 3202, the address (j (=1 to 3) when the command of FIG. 32 is input) of the table, and the write information (all '1' when the command of FIG. 32 is input) corresponding to the address. When flow bundle decision unit 3003 of flow detector 2632 receives the information, control unit 3201 writes the write information corresponding to the address to flow bundle table 3202. Another command example is shown in the bottom row of FIG. 32. This command is for treating input ports 2, 3 and 4 as an input port group 1 formed of these input ports and to aggregate them into one flow bundle: flow_group 1. The table setting operation of packet forwarding apparatus 2600 at this time is similar to that for the flow1 to flow3, except that the setting values are different.

As another example of command, FIG. 33 shows commands for aggregating a packet having input port number of 2 and SIP 3101 and DIP 3102 of 10.10.10.* and 10.10.40.*, respectively, a packet having input port number of 3 and SIP 3101 and DIP 3102 of 10.10.20.* and 10.10.40.*, respectively, and a packet having input port number of 4 and SIP 3101 and DIP 3102 of 10.10.30.* and 10.10.40.*, respectively, among the packets received via input ports 2, 3 and 4 constituting an input port group, into flow_group 2. The table setting operation of packet forwarding apparatus 2600 at this time is again similar to the above-described operation.

The detailed operation of flow detector 2632 at the packet receiving time has been described. The operation of flow detector 2632 at the packet transmitting time is identical except for the decision conditions of matched address information 13. Specifically, when control unit 3001 receives packet header information 21, it reads flow entry 3110-1. When the information in In/Out 3107 is '0' ('1' at the packet receiving time), it compares SIP 3101, DIP 3102, SPORT 3103, DPORT 3104, output port number 3106, output label 3108, and output port group 3112 with SIP 311, DIP 312, SPORT 313, DPORT 314, output port number 336, label 318 (label for outputting is set), and output port group 333 in packet header information 21 (no comparison is carried out for input port number 3105, input label 3108 and input port group 3111 for which mask value "*" is set). When they match, it transmits the table address corresponding to the matched flow entry 3110 as matched address information 13 to flow bundle decision unit 3003. By providing output port group 3112 in entry 3110, it is possible to reduce the setting number of flow entries 3110, as in the case of flow detector 2632 at the packet receiving time.

(3) Detailed Operations of Bandwidth Monitoring Unit

Hereinafter, detailed operations of bandwidth monitoring unit 2633 that received flow bundle number 14 will be described with reference to FIGS. 34-37. Explained in the following is the case where an algorithm that corresponds to a cell monitoring algorithm for a fixed length bucket, i.e., continuous state Leaky Bucket Algorithm (hereinafter, referred to as "leaky bucket algorithm"), extended for use in bandwidth monitoring of a variable length packet is used as the bandwidth monitoring algorithm. The leaky bucket algorithm is described, e.g., in Chapter 4.4.2 of "The ATM Forum Specification version 4.0". The leaky bucket algorithm is a model of a leaky bucket having a certain depth. Water leaks in the monitored bandwidth while the bucket contains water. At the arrival of a cell, water of a fixed amount corresponding to one cell is poured into the bucket. The bucket has a depth so as to allow burst arrival of the cells. While the bucket can hold the water, the input cell is decided to be "conformant". When the bucket overflows, the input cell is decided to be "non-conformant". In the present embodiment, the amount of water to be poured in at the time of arrival of a packet is made variable, to realize bandwidth monitoring of packets of variable length.

Figure 34:
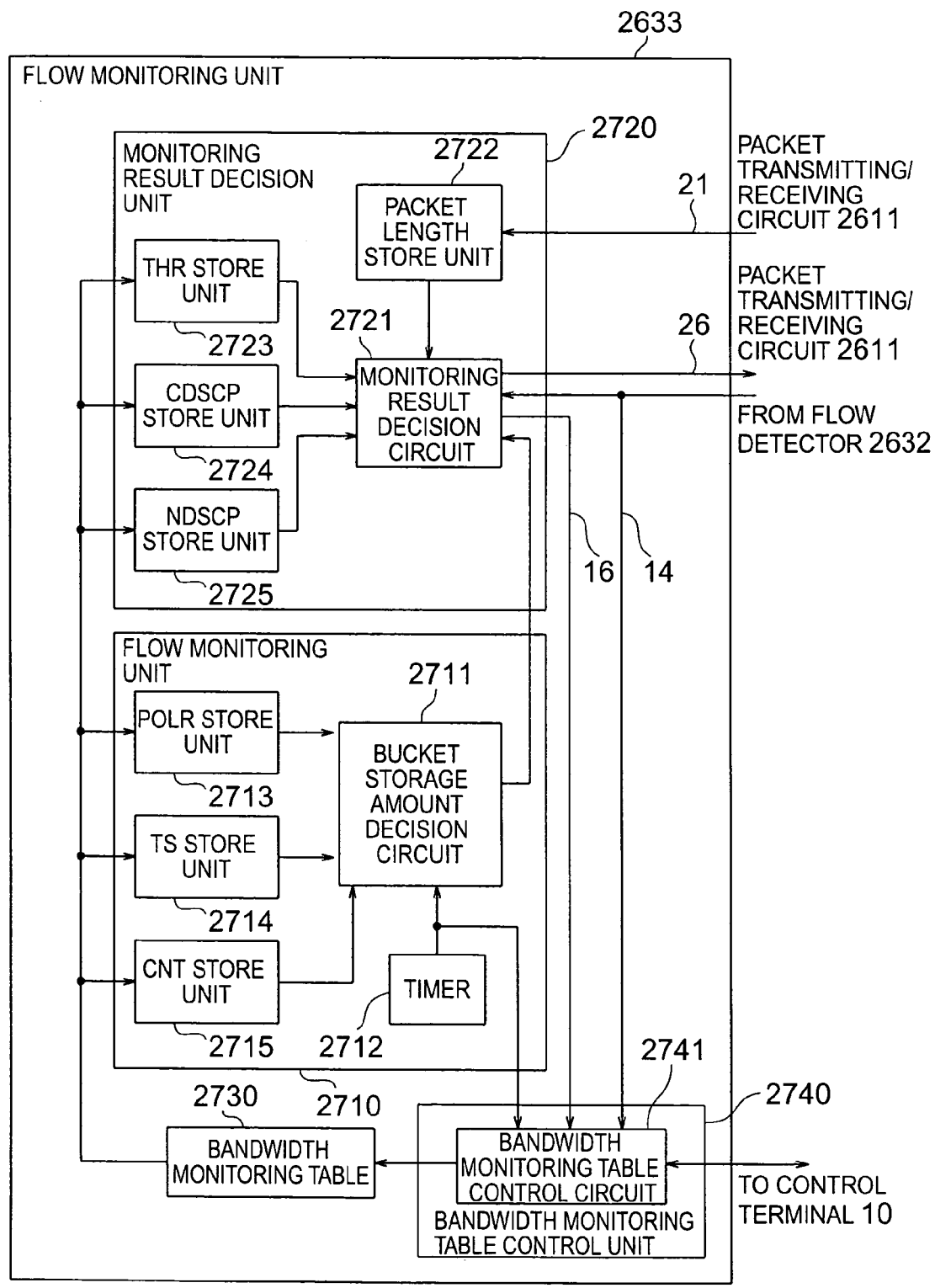
FIG. 34 shows a configuration example of a bandwidth-monitoring unit 2633.
Figure 35:
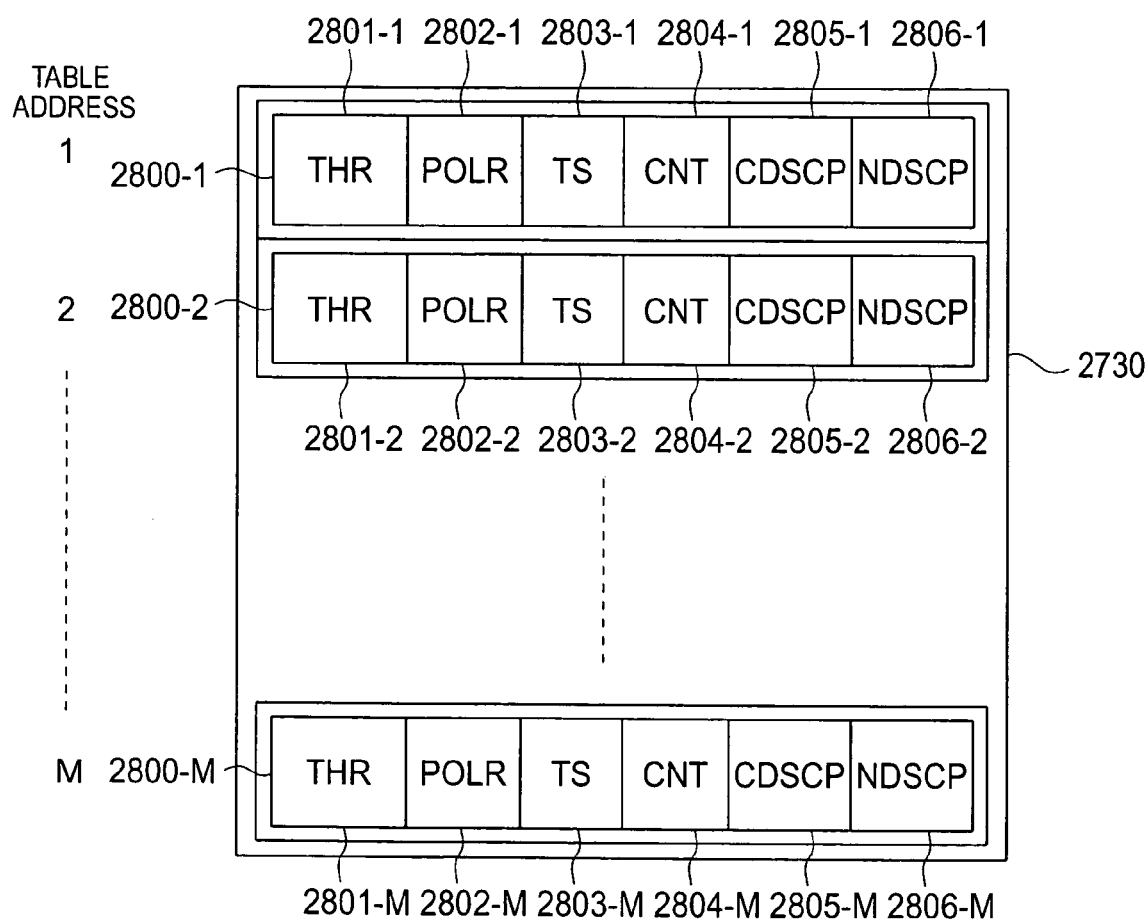
FIG. 35 shows a configuration example of a bandwidth-monitoring table 2730.

FIG. 34 is a block diagram of a bandwidth monitoring unit 2633. Bandwidth monitoring unit 2633 includes a bucket storage amount decision unit 2710, a monitoring result decision unit 2720, a bandwidth monitoring table 2730, and a bandwidth monitoring table control unit 2740. FIG. 35 shows a format of bandwidth monitoring table 2730. Bandwidth monitoring table 2730 includes M (≦N: the number of flow entries 3310-i) bandwidth monitoring control entries 2800-k (k=1 to M). Bandwidth monitoring unit 2633 performs bandwidth monitoring of one flow bundle with one bandwidth monitoring control entry 2800-k.

Bandwidth monitoring control entry 2800-k is formed of THR (Threshold) 2801 (Byte), which is a bucket depth representing the burst tolerance, POLR (Policing Rate) 2802 (Byte/sec), which is a bucket leaking rate representing the monitored bandwidth, TS (Time Stamp) 2803 (sec), which is time when a packet assigned with the same flow bundle number 14 arrived last time, CNT (Count) 2804 (Byte), which is the amount of water stored in the bucket immediately after conducting bandwidth monitoring of the preceding packet, and CDSCP (Conformant DSCP) 2805 and NDSCP (Non-Conformant DSCP) 2806, which are DSCP values assigned to the packets decided to be "conformant" and "non-conformant", respectively. THR 2801 and POLR 2802 are boundary conditions to decide whether the received packet is "conformant" or "non-conformant". CNT 2804 and TS 2803 correspond to the arrival history of the received packet.

Figures 36, 37:
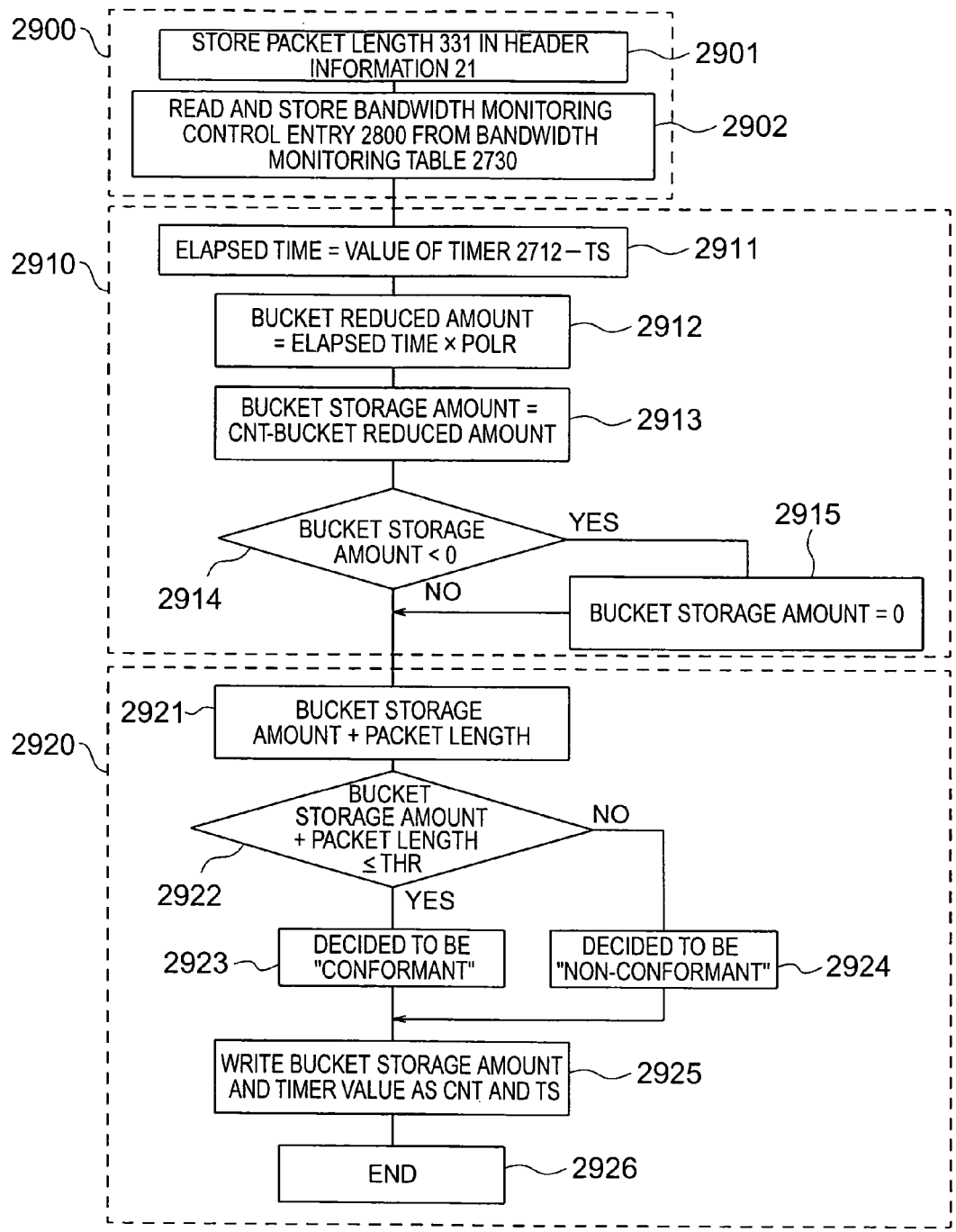
FIG. 36 is a flowchart of bandwidth monitoring unit 2633.
FIG. 37 shows an example of a command for setting bandwidth-monitoring table 2730.

FIG. 36 is a flowchart of bandwidth monitoring unit 2633. The processing of bandwidth monitoring unit 2633 includes bandwidth monitoring start processing 2900, bucket storage amount decision processing 2910, and monitoring result decision processing 2920, among which processing 2910 and processing 2920 are carried out primarily by bucket storage amount decision unit 2710 and monitoring result decision unit 2720, respectively.

When bandwidth monitoring unit 2633 receives packet header information 21, it stores packet length 331 in a packet length store unit 2722 of monitoring result decision unit 2720 (step 2901). A bandwidth monitoring table control circuit 2741 generates a read address of bandwidth monitoring table 2730 corresponding to flow bundle number 14, reads bandwidth monitoring control entry 2800, and stores THR 2801, CDSCP 2805 and NDSCP 2806 to a THR store unit 2723, a CDSCP store unit 2724 and a NDSCP store unit 2725, respectively, of monitoring result decision unit 2720, and stores POLR 2802, TS 2803 and CNT 2804 to a POLR store unit 2713, a TS store unit 2714 and a CNT store unit 2715, respectively, of bucket storage amount decision unit 2710 (step 2902).

In the bucket storage amount decision processing 2910, bucket storage amount decision unit 2710 calculates the amount of water in the bucket (bucket storage amount) immediately before input of the packet. Firstly, bucket storage amount decision circuit 2711 calculates a difference between the value of a timer 2712 that counts the current time and TS 2803 (sec) representing the arrival time of the previous packet in TS store unit 2714, to obtain an elapsed time (sec) from the arrival of the previous packet (step 2911). Next, it multiplies elapsed time (sec) by POLR 2802 (Byte/sec) in POLR store unit 2713, to obtain the amount of water (bucket reduced amount) leaked from the arrival of the previous packet (step 2912). Further, it subtracts the bucket reduced amount from CNT 2804 representing the bucket storage amount immediately after the bandwidth monitoring of the previous packet in CNT store unit 2715, to decide the bucket storage amount immediately before the input of the packet (step 2913). It then decides whether the bucket storage amount is positive or negative (step 2914), and if the decided result is negative, it corrects the bucket storage amount to "0" (meaning the bucket is empty) (step 2915).

In the monitoring result decision processing 2920, a monitoring result decision circuit 2721 of monitoring result decision unit 2720 decides whether the bucket can hold the water of the amount corresponding to the packet length of the input packet. Firstly, it adds packet length 331 (Byte) within packet length store unit 2722 to the bucket storage amount (Byte) calculated in the bucket storage amount decision processing 2910 (step 2921). It compares the depth of the bucket, THR 2801, stored in THR store unit 2723 with the above-described added value (step 2922). When the bucket storage amount+ packet length>THR 2801 meaning that the bucket will overflow if the water corresponding to the packet length is input, it decides the input packet to be "non-conformant", and transmits NDSCP 2806 in NDSCP store unit 2725 as DSCP information 26 to packet transmitting/receiving circuit 2611. It also transmits the value of the "bucket storage amount" as bucket storage amount information 16 representing the bucket storage amount immediately after the bandwidth monitoring, to bandwidth monitoring table control circuit 2741 (step 2924). Meanwhile, when the bucket storage amount+packet length≦THR 2801, it decides that the input packet is "conformant", and transmits CDSCP 2805 in CDSCP store unit 2724 as DSCP information 26 to packet transmitting/receiving circuit 2611. It also transmits the value of the "bucket storage amount+packet length" for adding the water corresponding to the input packet to the bucket, as bucket storage amount information 16 to bandwidth monitoring table control circuit 2741 (step 2923).

Bandwidth monitoring table control circuit 2741 writes bucket storage amount information 16 and the value of timer 2712 back to CNT 2804 and TS 2803 of entry 2800 corresponding to the flow bundle number 14, as the bucket storage amount immediately after the bandwidth monitoring and the arrival time of the packet, respectively (step 2925).

Figure 27:
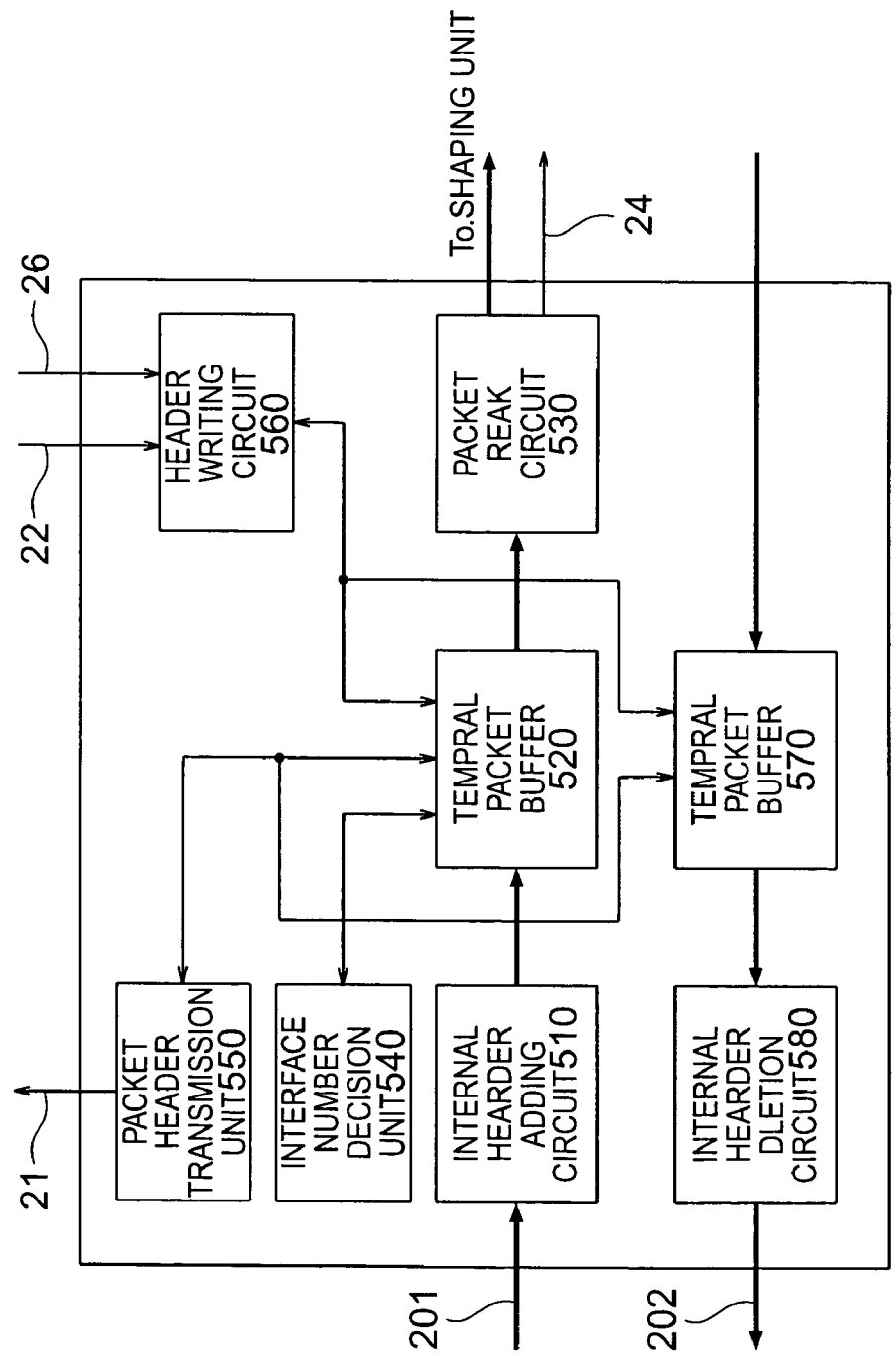
FIG. 27 shows a configuration example of a packet transmitting/receiving circuit 2611.

The case where bandwidth monitoring unit 2633 monitors the bandwidth for each flow bundle number 14 and decides the DSCP value based on the monitored result has been described above. Alternatively, the DSCP value may be designated to the packets decided to be "conformant", while the packets decided to be "non-conformant" may be discarded. For example, at the packet receiving time, packet transmitting/receiving circuit 2611 may interpret that DSCP value: "0" of DSCP information 26 represents packet discard, in which case, when the DSCP value is "0", packet read circuit 530 of packet transmitting/receiving circuit 2611 in FIG. 27 is made not to read the packet within temporal packet buffer 520. At this time, the packet in temporal packet buffer 520 is overwritten by the next packet input via input port 201, and eventually discarded.

It is noted that control terminal 10 sets bandwidth monitoring control entry 2800 via bandwidth monitoring table control circuit 2741. FIG. 37 shows a command for policing the packet of flow_group 1 at monitoring bandwidth: 100 Mbps and burst tolerance: 20 kbyte and for assigning DSCP of 5 for the packet decided to be "conformant" and DSCP of 6 for the packet decided to be "non-conformant". In this command: policing, the flow bundle number is set in 3701, the monitoring bandwidth and the burst tolerance are set in 3702 and 3703, and DSCP of the packets decided to be "conformant" and "non-conformant" in 3704 and 3705, respectively.

Upon receipt of such commands, control terminal 10 transmits to packet forwarding apparatus 2600 a write instruction to bandwidth monitoring table 2730, the address of the table (1 when the command of FIG. 37 is input), and the write information corresponding to the address (100 Mbps, 20 kbyte, 5 and 6 when the command of FIG. 37 is input). When bandwidth monitoring unit 2633 receives the information, bandwidth monitoring table control circuit 2741 of bandwidth monitoring table control unit 2740 writes 100 Mbps as the monitoring bandwidth to POLR 2802, 20 kbyte as the burst tolerance to THR 2801, 5 and 6 as the DSCP of the packet decided to be "conformant" or "non-conformant" to CDSCP 2805 and NDSCP 2806, respectively, and also writes the value of timer 2712 and 0 as the initial values to TS 2803 and CNT 2804, respectively. In this manner, setting of the bandwidth monitoring for each flow bundle number is implemented.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A packet forwarding apparatus for distributing packets received via a physical port to be transmitted over a plurality of physical ports, comprising:
 a transmitting/receiving unit for transmitting/receiving a packet via a physical port;
 a plurality of FIFOs for storing said packets therein, each of which is prepared for each of said plurality of physical ports;
 a port group decision unit for deciding a port group corresponding to the plurality of physical ports; and
 a port group control unit for controlling flow of packets for each of the port groups decided by said port group decision unit such that timings of reading packets stored in the FIFOs, each of which is prepared for each of said plurality of physical ports corresponding to said port group, are collectively controlled.

2. The packet forwarding apparatus according to claim 1, wherein said port group control unit controls the flow of the packets for each of classes of the packets as well as for each of said port groups.

3. The packet forwarding apparatus according to claim 1, wherein said port group corresponds to a plurality of physical ports aggregated by Link Aggregation, or corresponds to a physical port containing a protected LSP and a physical port containing a backup LSP for the protected LSP in a MPLS.

4. The packet forwarding apparatus according to claim 1, comprising a port group adding unit for adding the port group decided by said port group decision unit to the packet received by said transmitting/receiving unit.

5. The packet forwarding apparatus according to claim 1, wherein said FIFOs, each of which is prepared for each of said plurality of physical ports, includes a plurality of FIFOs provided corresponding to different classes, each class representing one of Quality of Service (QoS), type and priority of the packet.

6. The packet forwarding apparatus according to claim 1, further comprising an input/output control storage unit for storing input/output control information about input or output for each of said port groups, wherein
 said port group control unit performs control of each of said port groups based on the input/output control information of said input/output control storage unit corresponding to the relevant port group.

7. The packet forwarding apparatus according to claim 6, wherein said input/output control storage unit stores, as said input/output control information, information indicating a time or an interval or a bandwidth or the number of packets when receiving or transmitting packets belonging to the port group.

8. The packet forwarding apparatus according to claim 6, wherein said input/output control storage unit stores the input/output control information corresponding respectively to a minimum bandwidth and a maximum bandwidth.

9. The packet forwarding apparatus according to claim 6, wherein
 said input/output control storage unit includes a packet transmission control unit that controls a transmission time for transmitting a packet for each class of the packets belonging to said port group, and a bandwidth policy store unit that stores at least one of maximum bandwidth and minimum bandwidth for each class of the packets belonging to said port group, and
 said port group control unit calculates a transmission time for each class of the packets belonging to said port group based on the maximum bandwidth or the minimum bandwidth stored in said bandwidth policy store unit and stores the transmission time in said packet transmission control unit, and controls such that when the stored transmission time is past the current time, the corresponding packet is output to said transmitting/receiving unit.

10. The packet forwarding apparatus according to claim 9, wherein said port group control unit calculates a transmission time based on a maximum bandwidth for each class of the packets belonging to said port group stored in said bandwidth policy store unit and also calculates a transmission time based on a minimum bandwidth for each class of the packets belonging to said port group and stores the calculated transmission times in said packet transmission control unit, compares the transmission times with the current time for a packet corresponding to the class of the packets belonging to said port group, and controls such that the packet that has passed the transmission time based on the minimum bandwidth is output to said transmitting/receiving unit and such that the output of the packet that is ahead of the transmission time based on the maximum bandwidth is suspended.

11. The packet forwarding apparatus according to claim 6, comprising an output control setting input unit for selling and inputting input/output control information of said input/output control storage unit.

12. The packet forwarding apparatus according to claim 1, wherein said port group control unit decides a transmitting/receiving unit or a physical port for transmission of a packet received by said transmitting/receiving unit based on header information included in the packet.

13. A packet forwarding apparatus for distributing packets received from a physical port to be transmitted over a plurality of physical ports, comprising:
- a transmitting/receiving unit for receiving packets via a physical port;
- a plurality of buffers for storing the packets received by said receiving unit, each of said plurality of buffers being prepared for each of said plurality of physical ports;
- a buffer decision unit for deciding in which of said plurality of buffers each packet received by said receiving unit is to be stored based on information included in the packet; and
- a buffer read unit for reading the packets for a group of buffers among said plurality of buffers based on a control policy corresponding to the group such that timings of reading the packets stored in said buffers are collectively controlled; wherein
- the transmitting/receiving unit for transmitting the packets read by said buffer read unit to a physical port.

14. The packet forwarding apparatus according to claim 13, comprising a group storage unit for putting a plurality of buffers corresponding to a plurality of physical ports aggregated by Link Aggregation into a group, and for storing a control policy for the group.

15. The packet forwarding apparatus according to claim 13, comprising a storage unit for putting a buffer corresponding to a physical port containing a protected LSP of a MPLS and a buffer corresponding to a physical port containing a backup LSP for the protected LSP of the MPLS into a group, and for storing a control policy for the group.

16. A packet forwarding apparatus having a plurality of ports for transmitting received packets, comprising:
- a plurality of FIFOs for storing said packets therein, each of which is prepared for each output port and for each class;
- an output port group store unit for deciding output port groups corresponding to a plurality of output ports and storing correspondence relation between said output port groups and said output ports;
- a bandwidth policy store unit for storing a bandwidth policy therein for each of said output port groups and for each class;
- a packet transmission management unit for managing subsequent transmission time for each of said output port groups and for each class based on the bandwidth policies stored in said bandwidth policy store unit; and
- a packet read unit for reading a packet from one of said plurality of FIFOs and outputting said packet through an output port based on the subsequent transmission time managed by said packet transmission unit for each of output port group and for each class.

* * * * *